(12) United States Patent
Barron et al.

(10) Patent No.: US 9,934,485 B2
(45) Date of Patent: Apr. 3, 2018

(54) METHODS AND APPARATUS TO TRACK WIRE OR CABLE REELS IN AN INVENTORY STORAGE ENVIRONMENT USING A MOBILE DEVICE

(71) Applicant: Anixter, Inc., Glenview, IL (US)

(72) Inventors: Michael C. Barron, Barrington, IL (US); Peter Bordonaro, Chester, NH (US)

(73) Assignee: ANIXTER, INC., Glenview, IL (US)

( * ) Notice: Subject to any disclaimer, the term of this patent is extended or adjusted under 35 U.S.C. 154(b) by 175 days.

(21) Appl. No.: 14/972,688

(22) Filed: Dec. 17, 2015

(65) Prior Publication Data

US 2016/0260053 A1 Sep. 8, 2016

Related U.S. Application Data

(60) Provisional application No. 62/127,751, filed on Mar. 3, 2015.

(51) Int. Cl.

| G06Q 10/00 | (2012.01) |
| H04W 64/00 | (2009.01) |
| H04W 4/02 | (2009.01) |
| G06Q 10/08 | (2012.01) |
| G06F 17/30 | (2006.01) |

(52) U.S. Cl.
CPC ....... *G06Q 10/087* (2013.01); *G06F 17/3051* (2013.01); *H04W 4/023* (2013.01)

(58) Field of Classification Search
None
See application file for complete search history.

(56) References Cited

U.S. PATENT DOCUMENTS

| 4,928,233 A | 5/1990 | Millis |
| 5,712,789 A | 1/1998 | Radican |

(Continued)

FOREIGN PATENT DOCUMENTS

JP 2006127896 5/2006

OTHER PUBLICATIONS

Patent Cooperation Treaty, "International Search Report and Written Opinion of the International Searching Authority," issued in connection with Application No. PCT/US2016/017569, dated May 25, 2016, 12 pages.

(Continued)

*Primary Examiner* — Ariel J Yu
(74) *Attorney, Agent, or Firm* — Hanley, Flight and Zimmerman, LLC

(57) ABSTRACT

Examples are disclosed to track wire or cable inventory in an inventory storage environment using an application on a mobile device. During a material intake phase, an identifier of a wire or cable reel is stored in association with a physical location of the reel, a length of a wire or cable, and a type of the wire or cable. During a material retrieval phase, a target location corresponding to the physical location of the wire or cable reel is received in response to a search query. The wire or cable reel is located using a GPS receiver based on the target location when the mobile device is located farther than a threshold distance from the target location, or using a Bluetooth radio interface, without the GPS receiver, based on the target location when the mobile device is located closer than the threshold distance to the target location.

41 Claims, 23 Drawing Sheets

(56) References Cited

U.S. PATENT DOCUMENTS

| | | | |
|---|---|---|---|
| 6,148,291 | A | 11/2000 | Radican |
| 7,848,905 | B2 | 12/2010 | Troxler et al. |
| 7,983,965 | B2 | 7/2011 | Mejouev |
| 8,271,423 | B2 | 9/2012 | Kawai et al. |
| 8,584,942 | B1 | 11/2013 | Rayes et al. |
| 8,659,420 | B2 | 2/2014 | Salvat, Jr. |
| 8,688,410 | B2 | 4/2014 | Skidanov et al. |
| 8,756,166 | B2 | 6/2014 | Matthews |
| 8,831,920 | B2 | 9/2014 | Logatoc |
| 8,847,754 | B2 | 9/2014 | Buchheim et al. |
| 2003/0036983 | A1 | 2/2003 | Hougen et al. |
| 2003/0233293 | A1 | 12/2003 | Hsu et al. |
| 2007/0038415 | A1 | 2/2007 | Okada et al. |
| 2008/0174445 | A1 | 7/2008 | Calvarese et al. |
| 2009/0045915 | A1 | 2/2009 | Kennedy |
| 2011/0285506 | A1 | 11/2011 | Hillis |
| 2013/0138537 | A1* | 5/2013 | Hart .................. G06Q 10/087 705/28 |
| 2013/0282418 | A1 | 10/2013 | Furman et al. |
| 2014/0062700 | A1* | 3/2014 | Heine ................ G08B 13/2462 340/572.1 |
| 2014/0074667 | A1 | 3/2014 | Smith |
| 2014/0135042 | A1* | 5/2014 | Buchheim ................ G01S 1/68 455/456.6 |
| 2014/0154987 | A1 | 6/2014 | Lee et al. |
| 2015/0046299 | A1 | 2/2015 | Yan |
| 2015/0079942 | A1* | 3/2015 | Kostka ............... G06Q 30/0633 455/411 |
| 2015/0169597 | A1* | 6/2015 | Edge .................. G06F 17/3087 707/751 |

OTHER PUBLICATIONS

Canadian Intellectual Property Office, "Office Action," issued in connection with Canadian Patent Application No. 2,916,356, dated Jan. 23, 2017 (3 pages).

Patent Cooperation Treaty, "International Preliminary Report on Patentability," issued in connection with International Application No. PCT/US2016/017569, dated Apr. 13, 2017, 5 pages.

Canadian Patent Office, "Office Action," issued in connection with Canadian Patent Application No. 2,916,356, dated Dec. 28, 2017, 5 pages.

\* cited by examiner

FIG. 8

| | | | | | | ◀ ☰ | ⊗ ADMIN |
|---|---|---|---|---|---|---|---|
| ☰ | | | | | | | |
| 🔍 USERS | | | | | | | |
| SEARCH FILTER | | | | | | + Add New User | |
| Showing 6/6 entries | | | | | | | |
| NAME | EMAIL | | USERNAME | ROLE | CUSTOMER ID | ACTIONS | |
| Stephen | Stephen@gmail.com | | Stephen@gmail.com | ADMIN | | ✏️ ⊗ | |
| Alex | Alex@gmail.com | | Alex@gmail.com | CUSTOMER | M1-15KV-1 | ✏️ ⊗ | |
| Amanda | Amanda@gmail.com | | Amanda@gmail.com | USER | P1-500 | ✏️ ⊗ | |
| Nickie | Nickie@gmail.com | | Nickie@gmail.com | ADMIN | | ✏️ ⊗ | |
| Nick | Nick@gmail.com | | Nick@gmail.com | ADMIN | | ✏️ ⊗ | |

FIG. 9

| Reel ID | Product Name | Supplier Part | Description | Customer ID | Start Footage | End Footage | Quantity La... | Area | ACTIONS |
|---|---|---|---|---|---|---|---|---|---|
| 0-1430M-4 | Central Office Telecom Power Cable | 38AL-0201-... | Tinned or... | M1-15KV-2... | 5000 | 4500 | 2015-02-09 | FL | ⊘ ⊗ |
| 0-1560K-0 | Strand Annealed Copper Cable | 6G-1601-06... | Recomme... | M1-15KV-1 | 5000 | 2330 | 2015-02-09 | San Francisco | ⊘ ⊗ |
| 0-1612N-2 | Central Office Telecom Power Cable | 38AL-020... | Tinned or... | P1-1/0 | 52 | 23 | 2015-02-09 | Miami | ⊘ ⊗ |

FIG. 10

Inventory/Info

Selected Inventory Details

| | | | |
|---|---|---|---|
| Reel ID | O-1430M-4 | Customer ID | M1-15KV-250 |
| Product Name | Central Office Telecom Power Cable | Color | Gray |
| Purchase Order Number | 30467-252-17-6-004P0 | Area | FL |
| Description | TINNED OR COATED COPPER | | |
| Start Footage | 5000 | | |
| End Footage | 4500 | | |

Inventory
Users

ADMIN

| REEL ID | PRODUCT NAME | SUPPLIER PART NO. | DESCRIPTION | CUSTOMER ID | LENGTH REMAINING | BEACON | LOCATION | ACTIONS |
|---|---|---|---|---|---|---|---|---|
| 0-1430M-4 | Central Office Telecom Power Cable | 38AL-0201-09 | Tinned or coa... | M1-15KV-250 | 4498 | attached | 37.419698,-121.897207 | |
| 0-1560K-0 | Strand Annealed Copper Cable | 6G-1601-06-ROHS | Recommended... | M1-15KV-1 | 2330 | not attached | No location | |
| 0-1612N-2 | Central Office Telecom Power Cable | 38AL-0201-09 | Tinned or coa... | P1-500 | 23 | attached | 32.931647,-97.165514 | |
| 0-1430M-6 | SOV Cable | 38AL-0500-10 | SOV cable | M1-15KV-250 | 5000 | attached | 42.148423,-88.108760 | |
| 5-5500M-9 | SOS Cable | 38AL-1200-10 | SOS Cable | M1-15KV-1 | 6000 | not attached | No location | |
| 1-1580M-9 | Fiber Optics | 3CAL-0201-09 | ATLOS Loose Tub.. | P1-4/0 | 8000 | attached | 32.748387,-97.328529 | |
| 2-2330M-3 | Switchboard Cable | 3ANX-0201-08 | 2071E WH 4/23 | P1-1/0 | 2000 | attached | 32.748466,-97.328346 | |
| 0-3239M-7 | Copper Cable | 7MAL-0231-10 | Copper Cable | P1-4/0 | 3350 | attached | 32.748400,-97.328281 | |
| 1-3821M-9 | Exchange and Distribution Cable | 6MAB-0401-05 | Exchange Cab... | P1-1/0 | 4500 | attached | 32.748443,-97.328319 | |

METHODS AND APPARATUS TO TRACK WIRE OR CABLE REELS IN AN INVENTORY STORAGE ENVIRONMENT USING A MOBILE DEVICE

RELATED APPLICATIONS

This patent claims the benefit of U.S. Provisional Patent Application No. 62/127,751, filed on Mar. 3, 2015, which is hereby incorporated herein by reference in its entirety.

FIELD OF THE DISCLOSURE

This disclosure relates generally to inventory management and, more particularly, to tracking wire or cable in an inventory storage environment using a mobile device.

BACKGROUND

Electricians and technicians often retrieve electrical cables and wires from large, indoor or outdoor, inventory storage yards for applications in projects or construction. Reels of cable or wire of different lengths, types and gauges are stored in these large inventory storage areas. Electricians and technicians often search for cable or wire of appropriate types and gauges in storage yards containing hundreds or thousands of reels. In addition to types and gauges of cable or wire, numerous reels of the same cable or wire may contain different lengths. For example, an electrician may wish to use 100 feet of aluminum wire with a gauge of 102 mil in diameter. If separate reels of 125, 175, and 200 feet are available for the desired material and gauge type, selecting the 200 foot reel preserves 100 or more feet of wire on each reel to accommodate subsequent needs for long wire runs using any of the reels. Selecting the 125 foot reel would result in only 25 feet of available wire, for a subsequent wire run, which would have limited use unless 25 or less feet of wire is needed.

BRIEF DESCRIPTION OF THE DRAWINGS

Figure 8:
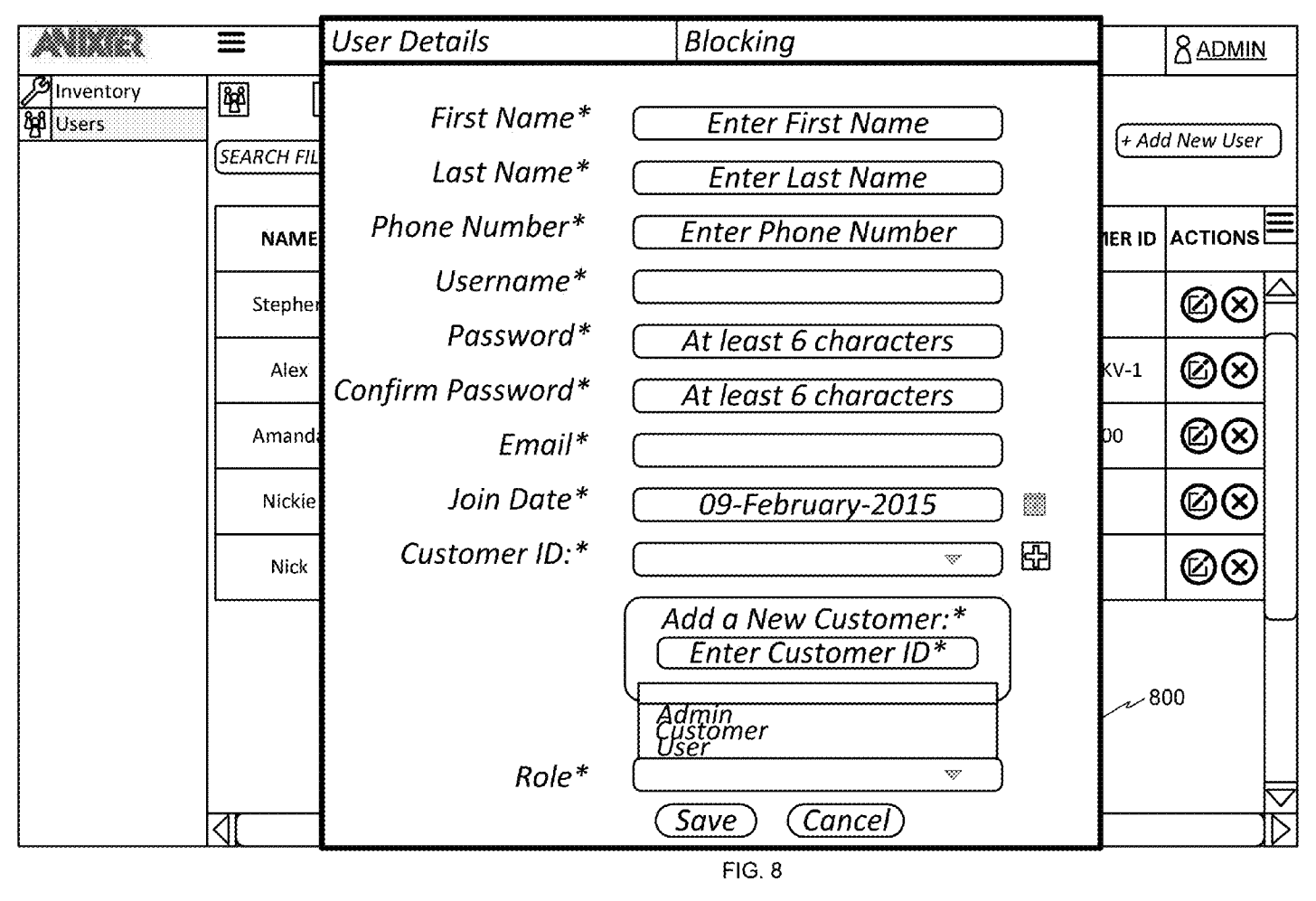

FIGS. 8 and 9 are example user interfaces that may be used to change access permissions of users to access wire or cable reel inventory information in the example inventory management server of FIGS. 1 and 4.

FIGS. 10, 11, and 12 are example user interfaces of the inventory management server of FIGS. 1 and 4 that may be used to store inventory information about wire or cable reels in the example inventory database of FIG. 1.

Figure 14:
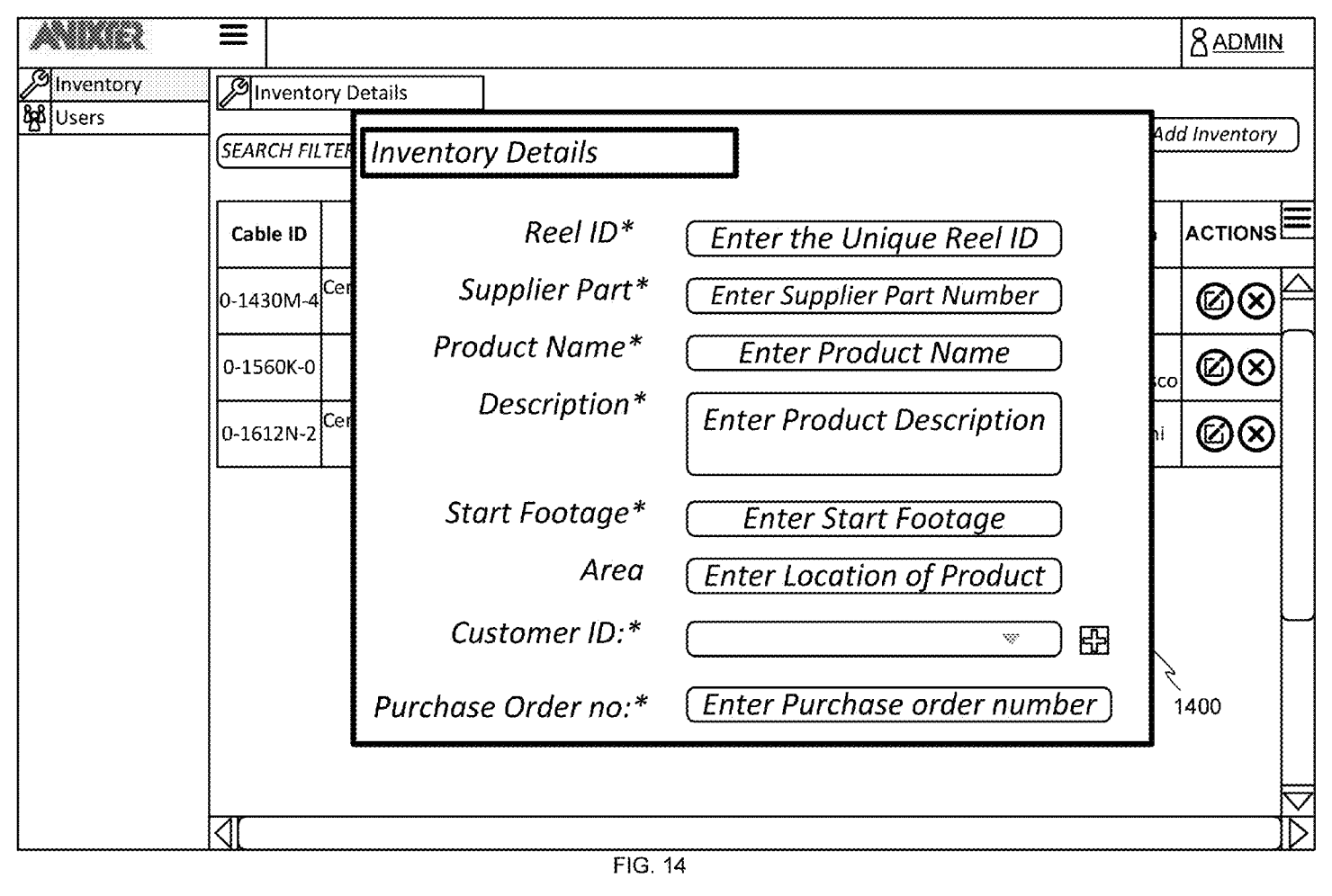

FIG. 14 is an example user interface to access wire or cable information in the example inventory management server of FIGS. 1 and 4.

DETAILED DESCRIPTION

Figure 1:
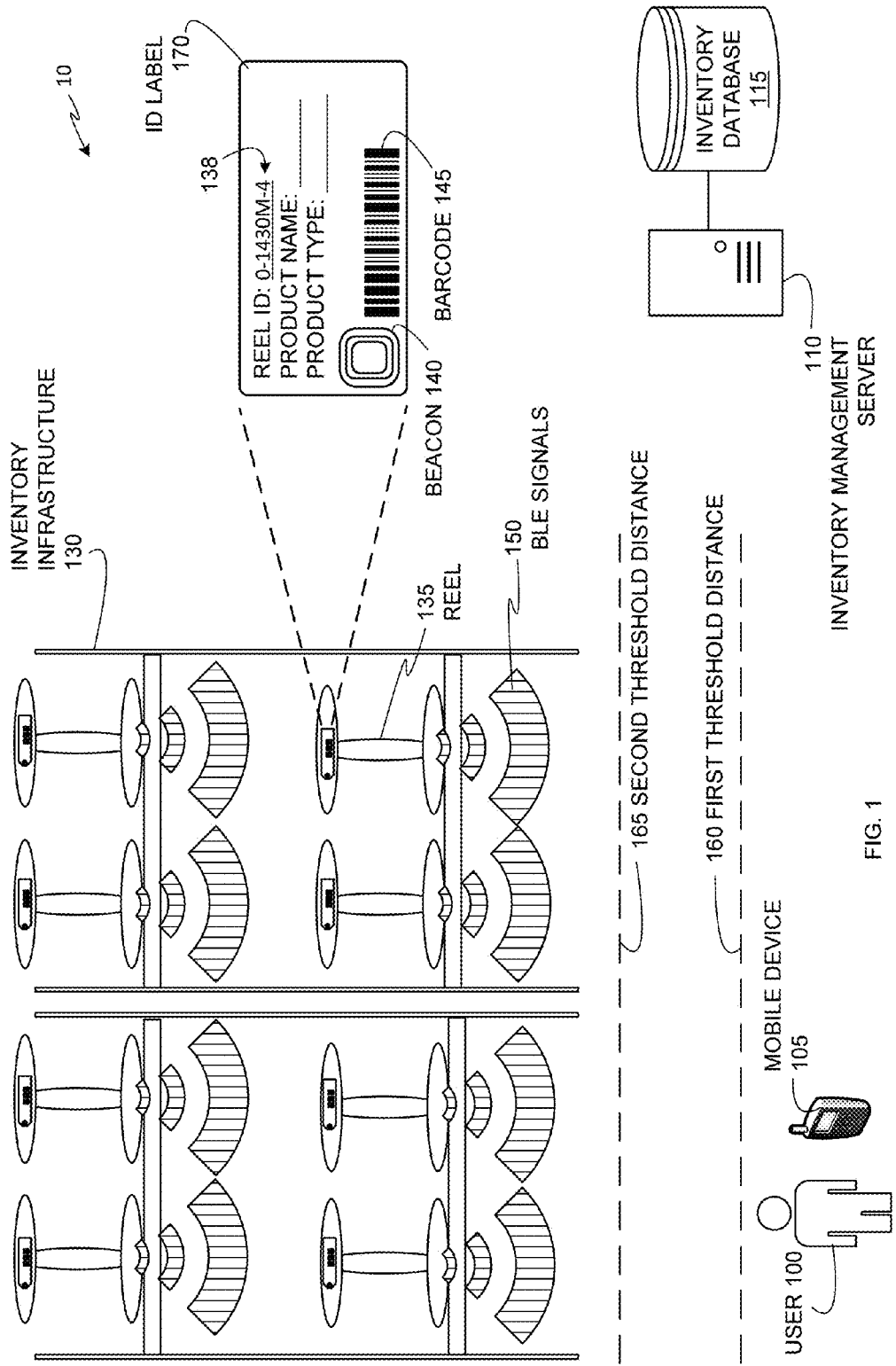
FIG. 1 depicts an example wire or cable reel tracking system.

Businesses often use inventory management systems to track information about products that are constantly added or removed from inventory. Examples disclosed herein may be used in connection with inventory storage environments to enable businesses to operate more efficiently by facilitating more quickly identifying locations of products in the inventory storage environments than prior techniques of locating inventory.

Examples disclosed herein enable managing locations of wire or cable reel and corresponding information such as wire or cable types and lengths. For example, electricians and technicians often retrieve electrical wires or cables from large, indoor or outdoor, inventory storage yards for applications in projects or construction. Reels of wire or cable of different lengths, types and gauges are stored in these large inventory storage areas. Finding the appropriate type and length of wire or cable can be challenging in storage yards containing hundreds or thousands of reels. Furthermore, once the location of a specific type and gauge of a wire and/or cable reel is identified, selecting an available reel from which to take a particular length is challenging. For example, an electrician may wish to use 100 feet of aluminum wire with a gauge of 102 mil in diameter. If separate reels of 125, 175, and 200 feet are available for the desired material and gauge type, selecting the 200 foot reel preserves 100 or more feet of wire on each reel to accommodate subsequent needs for long wire runs using any of the reels. Selecting the 125 foot reel would result in only 25 feet of available wire, for a subsequent wire run, which would have limited use to runs of 25 or less feet of wire. Examples disclosed herein facilitate making more informed decisions about selecting wire or cable reels in storage yards during wire and/or cable installation projects to enable businesses to more efficiently utilize their existing wire or cable inventories.

Examples disclosed herein are described in connection with wire and cable. The terms wire and cable are used interchangeably as example inventory material for which examples disclosed herein may be used to track, manage, and/or locate in an inventory storage environment. Thus, when examples are disclosed herein in connection with wire, such examples are equally applicable to cable. Similarly, when examples are disclosed herein in connection with cable, such examples are equally applicable to wire. Also, examples disclosed herein are applicable for use in connection with inventories that include both wire and cable reels. Thus, when examples disclosed herein are describe in connection with wire or cable, such examples are applicable to wire inventories, to cable inventories, and to inventories having both wire and cable. In addition, although examples disclosed herein in connection with wire or cable, such examples are equally applicable for use in tracking, managing, and/or locating other types of material in an inventory storage environment.

An example reel tracker disclosed herein facilitates locating, utilizing, and updating characteristics of wire or cable stored on reels in inventory storage environments. The example reel tracker communicates with a cloud-based inventory data store that may be used to store wire or cable properties and reel locations for use in guiding users to particular wire lengths and/or types. In addition, examples disclosed herein facilitate granting access to such wire by persons such as outside contractors, electricians, technicians, etc. Further, examples disclosed herein allow users to maintain up-to-date locations for wire or cable reels even when the reels are moved to different locations. In addition, examples disclosed herein facilitate locating items outdoors or indoors within buildings.

FIG. 1 is an example wire or cable reel tracking system 10. The example system 10 includes an example mobile device 105 that may be used by a user 100, such as an electrician, technician, contractor and/or any other user. The example mobile device 105 includes GPS and Bluetooth capabilities. The example system 10 also includes an inventory management server 110 that communicates with the mobile device 105 to receive and store wire or cable reel information and provide inventory data. The example inventory management server 110 can manage numerous categories of information for wire or cable reels, and can update or store information in an example inventory database 115 (e.g., in real time, or near real time).

In the illustrated example of FIG. 1, the inventory management server 110 and the inventory database 115 are accessible by the mobile device 105 via a cloud infrastructure. The example mobile device 105 may communicate with the inventory management server 110 using, for example, protocols such as Hypertext Transfer Protocol (HTTP), Transmission Control Protocol (TCP), and/or Internet Protocol (IP). These communications are interpreted and processed by the example inventory management server 110. Based on the communications from the example mobile device 105, the example inventory management server 110 accesses the inventory database 115 for relevant information. Additionally, the example inventory management server 110 can communicate with the mobile device 105 via, for example, protocols such as HTTP, TCP, and/or IP. For example, the inventory management server 110 may communicate with the mobile device 105 to confirm that an update for reel inventory information has been saved and stored in the inventory database 115.

FIG. 1 also shows an inventory infrastructure 130 which could be, for example, shelves, racks, hooks, and/or any other type of physical structures used to store inventory. In the illustrated example, the inventory infrastructure 130 stores reels 135 of wire or cable. The example inventory infrastructure 130 may support storage space for hundreds or thousands of reels 135 in an example jobsite or inventory storage environment. Each example reel 135 includes an example reel identifier 138 (e.g., a reel ID, a cable ID, a wire ID, etc.). The example reel identifier 138 may be used to associate corresponding reels 135 with corresponding wire or cable reel characteristics that are stored in the inventory database 115. In the illustrated example, the reel identifier 138 could be encoded in an example beacon 140 and/or in an example barcode 145 located on the reel 135. For example, if the reel identifier 138 is encoded in the beacon 140, a device such as the mobile device 105 could obtain the reel identifier 138 from the beacon 140 using wireless communications such as Bluetooth communications or any other suitable type of wireless communications. If the reel identifier 138 is encoded on the barcode 145, a device such as the mobile device 105 could obtain the reel identifier 138 from the barcode 145 using a camera or an infrared scanner. Although barcodes 145 are shown in the illustrated example, in other examples, quick response (QR) codes and/or any other print-based optically scannable indicia may be used instead of or in addition to the barcodes 145 to provide unique identifiers associated with corresponding ones of the reels 135. In other examples, barcodes 145 and other print-based optically scannable indicia representing the reel identifier 138 may be omitted from the reels 135. In such examples, the reel identifier 138 may be encoded in and accessible from the beacons 140 using wireless communications, and the barcodes 145 may be omitted or may be present for the option to optically scan them.

In the illustrated example, each reel 135 includes a corresponding example beacon 140. The beacons 140 of the illustrated example include memories or data stores (e.g., the example memory 315 of FIG. 3) to store characteristic information related to wire or cable spooled on corresponding ones of the reels 135. In addition, the beacons 140 can transmit the stored characteristic information for reception by, for example, the mobile device 105. Further, the beacons 140 of the illustrated example include Bluetooth low-energy (BLE) circuits or devices to emit BLE signals 150. The example BLE signals 150 can be used to communicate with the example mobile device 105. Bluetooth is a wireless technology standard for exchanging data over short distances. Bluetooth-enabled devices are capable of emitting signals to communicate with other Bluetooth-enabled devices. In examples disclosed herein, Bluetooth is also used for short range navigation such as inside buildings and small spaces.

BLE is a type of Bluetooth technology that provides reduced power consumption and cost while maintaining a similar communication range as standard Bluetooth. BLE devices have longer battery life as a result of reduced power consumption. The example beacons 140 of FIG. 1 are low-powered, low-cost transmitters used to locate corresponding reels 135 at inventory storage locations. In some examples, the beacon 140 is implemented using an iBeacon, designed and sold by Apple, Inc. Example iBeacons which may be used to implement the beacon 140 have the following characteristics: 3 years, or more, of battery life using smart power management; waterproof; tracking-enabled when mounted to items in a yard (metal, copper and wood items will be stacked against each other in the yard); broad temperature tolerance range (rated from 10 degrees up to 150 degrees Fahrenheit); can be a "Stick & Find" beacon. Other types of iBeacons having fewer, more, and/or different characteristics and/or features may additionally or alternatively be used.

In the illustrated example of FIG. 1, the user 100 is able to add or search for a specific wire or cable reel 135 by communicating with the inventory management server 110. Upon request, the example inventory management server 110 can send reel location information (e.g., latitude and longitude) to the mobile device 105. The example mobile device 105 is provided with Global Positioning System (GPS) capability to process the provided location information and direct the user 100 toward a general location of the reel 135 based on the received reel location information and GPS location tracking.

In the example system 10, the mobile device 105 uses its GPS capability to navigate the user 100 toward a proximate location of the desired reel 135, for example, outside a predefined first threshold distance 160 from the reel 135. GPS is a satellite-based navigation system that provides location and time information based on signals transmitted by GPS satellites. GPS satellites broadcast, or transmit, signals to receivers, such as computers and mobile devices, that enable the receivers to identify their current location and aid in routing receivers to a desired location. In urban environments and inside buildings, GPS signals bounce off of metal and often provide inaccurate location identification. In addition, some GPS implementations have accuracies only within a few or more meters.

While long range navigation systems such as GPS can be used to guide individuals to target locations across long distances, GPS is less effective in guiding individuals to an exact location within an accuracy of less than a meter (e.g., a one-foot accuracy). As such, the example mobile device 105 uses GPS to guide the user 100 to the general vicinity of the wire or cable reel 135. When the example user 100 (and mobile device 105) is within the first threshold distance 160 from the reel 135, the example mobile device 105 ceases its use of GPS and activates use of its Bluetooth capability to locate the wire or cable reel 135. In this manner, the mobile device 105 can use BLE communications with the beacon 140 to guide the user 100 to the exact location (e.g., within inches) of the reel 135 of interest.

In the illustrated example, the first threshold distance 160 is selected based on when GPS location tracking can no longer provide accurate location information relative to a desired reel 135. For example, if GPS accuracy is three meters, the first threshold distance 160 may be set to three meters. In some examples, if the desired reel 135 is indoors at a location where GPS signals cannot be received by the mobile device 105, the first threshold distance 160 is based on a location at which the mobile device 105 is moved into the indoor environment. When the example mobile device 105 is within the example second threshold distance 165, the mobile device 105 emits an alert to notify the user 100 that the reel 135 is within very close proximity. At that point, the user 100 can visually inspect an ID label 170 on the reel 135 and/or use the mobile device 105 to obtain the reel identifier 138 of the reel 135 (e.g., by scanning the barcode 145, or by obtaining the reel identifier 138 via wireless communications from the beacon 140) to confirm that the reel 135 is the reel of interest.

The example mobile device 105 provides an alert (e.g., via an example alert 230) to notify the user 100 when the mobile device 105 is within a second threshold distance 165 and within close proximity of the beacon 140. For example, the mobile device 105 may provide a vibrating alert that becomes more intense or more frequent as the mobile device 105 moves closer to the beacon 140 (e.g., a "Zero-in" feature). In some examples, the mobile device 105 is configured to emit a continuous alert (e.g., a vibration alert) as the user 100 hovers or waves the mobile device 105 proximate to the reel 135 of interest. In other examples, the mobile device 105 analyzes the signal strength of the BLE signals 150 from the beacon 140 (e.g., using the Bluetooth transceiver 205) and emits an alert indicating discovery of the target beacon 140 when the signal strength of the BLE signals 150 detected by the mobile device 105 exceeds a threshold (e.g., when the example mobile device 105 is in close proximity to the beacon 140). In some such examples, the mobile device 105 changes intensity or frequency of an alert as the mobile device 105 is moved closer to the reel 135 of interest. In this manner, the user 100 can more easily identify the reel 135 of interest based on when the provided alert indicates that the reel 135 is the closest to the mobile device 105.

Using BLE technology in connection with examples disclosed herein has numerous advantages over prior solutions that employ, for example, radio frequency identification (RFID) technology. For example, RFID tags require passing proximate or near a sensor to signal a location change (e.g., setting off an alarm after leaving a retail store with security-tagged merchandise). RFID solutions also require a grid system implementation (e.g., using pins, sensors, antennas, etc.) to extend tracking range. Using example beacons 140 with BLE technology as disclosed herein does not require on-site set up of signal strengthening/relaying infrastructure. That is, BLE beacons 140 can remain stationary and be detected by a handheld mobile device 105 from over 100 feet away. In addition, BLE beacons 140 disclosed herein can store location information indicative of their locations. Such location information can be communicated to the BLE beacons 140 by a mobile device 105. In addition, a BLE beacon 140 can share its stored information with the mobile device 105 for synchronizing with the inventory database 115. In addition, when the example mobile device 105 is within range of the BLE signals 150, the BLE signals 150 can be used by the mobile device 105 to identify target locations of reels 135. In addition, because example BLE beacons 140 disclosed herein store location and wire or cable characteristics of their corresponding reels 135, the BLE beacons 140 can operate independent of the inventory database 115 should the inventory database 115 be unreachable by the mobile device 105 (e.g., due to poor network coverage, inventory database 115 is inoperable, etc.). For example, when the mobile device 105 is at a jobsite in proximity to numerous reels 135, a user may perform a search for particular wire or cable. Without needing to access the inventory database 115, the mobile device 105 may perform the search based on reel information stored in and emitted by beacons 140 located on the reels 135.

Figure 2:
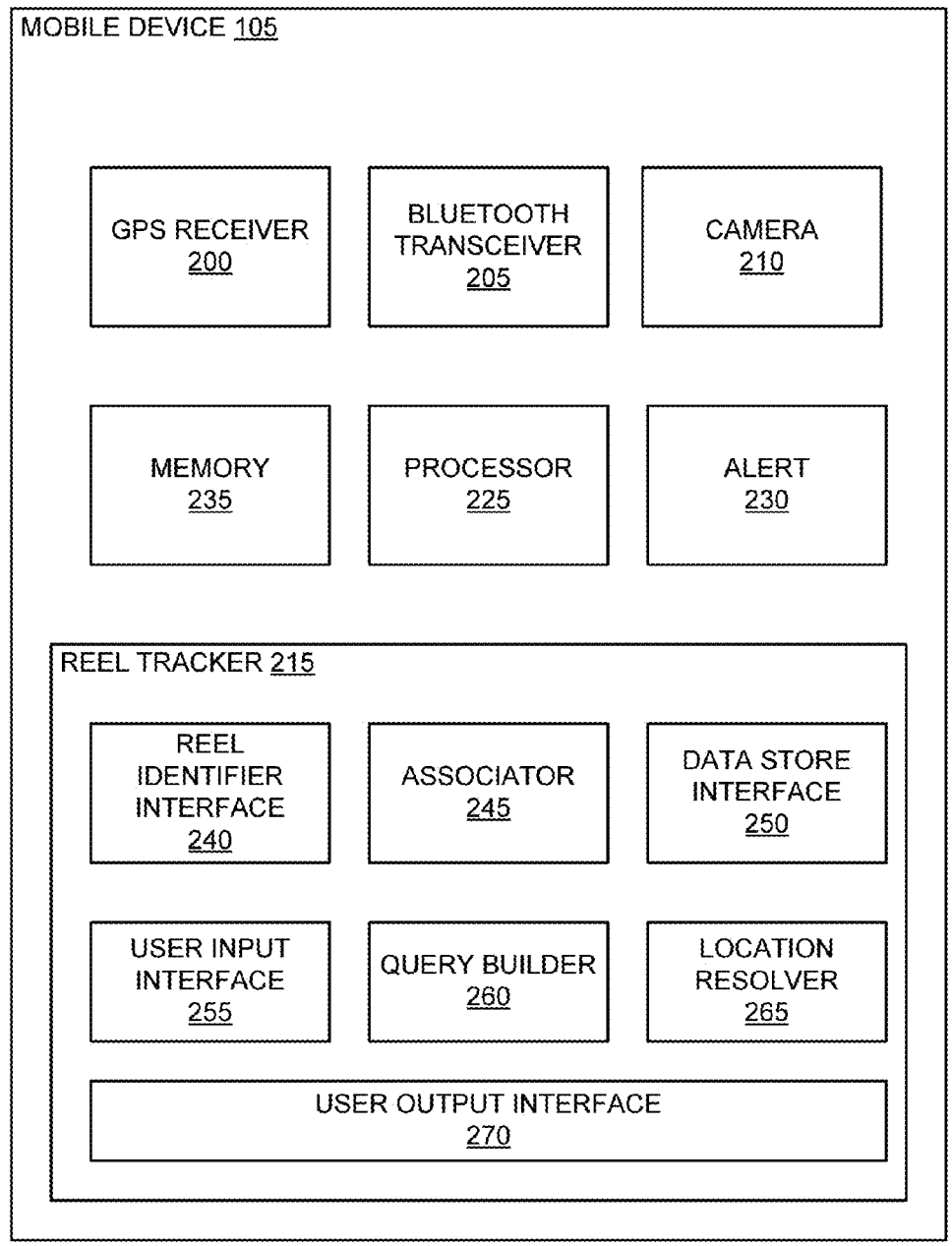
FIG. 2 is the example mobile device of FIG. 1 that may be used in the example wire or cable reel tracking system of FIG. 1.

FIG. 2 is the example mobile device 105 of FIG. 1. In the illustrated example of FIG. 2, the mobile device 105 is provided with an example GPS receiver 200, and example Bluetooth transceiver 205, an example camera 210, an example reel tracker 215, an example processor 225, an example alert 230, and an example memory. The example mobile device 105 is provided with the example GPS receiver 200 to determine location information based on signals received from GPS satellites. For example, the GSP receiver 200 may receive GPS signals from the GPS satellites to generate GPS location information. In the illustrated example, the GPS receiver 200 provides the GPS location information to the reel tracker 215 to determine locations of wire or cable reels (e.g., the reels 135 of FIG. 1).

The example mobile device 105 is provided with the example Bluetooth transceiver 205 to receive Bluetooth signals (e.g., the BLE signals 150 of FIG. 1) from beacons 140 (FIG. 1) located on the wire or cable reels 135. The example mobile device 105 also uses the example Bluetooth transceiver 205 to transmit wire or cable characteristic information via Bluetooth signals (e.g., BLE signals) to the beacons 140. In this manner, the beacons 140 can store such characteristic information corresponding to wire or cable spooled on corresponding ones of the reels 135.

The example mobile device 105 is provided with the example camera 210 to scan the example barcodes 145 on the reels 135 in the example system 10 of FIG. 1. In some examples, the camera 210 may be used to scan QR codes instead of or in addition to the barcodes 145 to identify corresponding ones of the reels 135. In some examples, the mobile device 105 may be provided with an infrared (IR) scanner instead of or in addition to the camera 210 to scan the barcodes 145, QR codes, or any other indicia (e.g., alpha-numeric codes, words, numerical values, symbols, etc.) to identify the reels 135. In yet other examples, scanning of an identifier of a reel 135 may be performed by scanning the beacon 140 using Bluetooth communications to retrieve the identifier of the reel 135

The example mobile device 105 is provided with the example processor 225 to execute computer-readable instructions stored in the example memory 235. For example, the processor 225 may execute such instructions to control overall operation of the mobile device 105 including examples disclosed herein to track, manage, and/or locate wire or cable in an inventory storage environment. The processor 225 may execute instructions to implement some, portions of, or all of the GPS receiver 200, the Bluetooth transceiver 205, and/or the reel tracker 215. The example processor 225 may be implemented using the example processor 2312 of FIG. 23. Although only one processor is shown, the mobile device 105 may be provided with multiple processors, one or more of which may be used to implement examples disclosed herein. The example memory 235 may be implemented using one or more of the example volatile memory 2314, the example non-volatile memory 2316, the example mass storage device 2328 of FIG. 23, and/or removable tangible computer readable storage media.

The example mobile device 105 is provided with the example alert 230 to provide notifications (e.g., audible notifications, vibratory notifications, visual notifications, etc.) that inform users (e.g., the user 100 of FIG. 1) regarding proximity of the mobile device 105 to a target reel 135 as described above in connection with FIG. 1. The alert 230 may be implemented using a speaker or buzzer to provide audible alerts, a vibration motor or actuator to provide vibration alerts, a light emitting diode (LED) to provide visual alerts. Although one alert is shown, the mobile device 105 may be provided with numerous alerts of the same or different types.

The example mobile device 105 is provided with the example reel tracker 215 to perform location seeking and inventory management of wire or cable reels in accordance with the techniques disclosed herein. The reel tracker 215 may be implemented using software, firmware, hardware, and/or a combination thereof. In some examples, some or all of the reel tracker 215 is implemented as an application (e.g., an app) for installation, execution, and use on mobile devices such as the mobile device 105. In the illustrated, the reel tracker 215 is provided with an example reel identifier interface 240, an example associator 245, an example data store interface 250, an example user input interface 255, an example query builder 260, an example location resolver 265, and an example user output interface 270.

The example reel tracker 215 is provided with the reel identifier interface 240 to identify reels 135 located in the example inventory infrastructure 130 of FIG. 1. For example, the reel identifier interface 240 may receive image or scan data from the example camera 210 and decode or otherwise determine reel identifiers (ID's) 138 (FIG. 1) (e.g., a Unique Device Identifier (UDID)) encoded in scanned ones of the barcodes 145 (FIG. 1). Additionally or alternatively, the reel identifier interface 240 may receive reel identifiers 138 of reels 135 from the Bluetooth transceiver 205 based on wireless communications between the Bluetooth transceiver 205 and the beacons 140 of the reels 135. In this manner, the reel identifier interface 240 can provide unique identifiers to identify ones of the reels 135.

The example reel tracker 215 is provided with the example associator 245 to associate ID's of ones of the reels 135 with corresponding physical locations of the reels 135 in an inventory storage environment, lengths of wire or cable on the reels 135, types of wire or cable on the reels 135, and/or any other characteristic information about wire or cable on the reels 135.

The example reel tracker 215 is provided with the example data store interface 250 to store physical locations of the reels 135, wire or cable lengths on the reels 135, types of wire or cable on the reels 135, and/or any other information or characteristics of wire or cable on the reels 135 at a network data store (e.g., the inventory database 115 of FIG. 1) that is separate from the mobile device 105. The example data store interface 250 also sends physical locations of the reels 135, wire or cable lengths on the reels 135, types of wire or cable on the reels 135, and/or any other information or characteristics of wire or cable on the reels 135 to the beacons 140 for locally storing in memories (e.g., the memory 315 of FIG. 3) of the beacons 140. The example data store interface 250 also retrieves information from the inventory database 115 and/or from the beacons 140 for use in locating reels 135 and/or for presenting to the user 100.

The example reel tracker 215 is provided with the example user input interface 255 to receive information, inputs, and/or selections provided by the user 100 via graphical user interfaces displayed on the mobile device 105. Example graphical user interfaces displayed by the mobile device 105 are shown in FIGS. 6, 13, 15-19, 21, and 22.

The example reel tracker 215 is provided with the example query builder 260 to generate search queries based on search information provided by the user 100. For example, the user 100 may submit one or more keywords or a search string to find a particular one of the reels 135 and/or to obtain information about available wire or cable on one or more of the reels 135. The example user input interface 255 may provide the keyword(s) or search string to the query builder 260, and the query builder 260 may generate a query based on the keyword(s) or search string using a format compatible with the inventory management server 110 and/or the inventory database 115 of FIG. 1. In the illustrated example, the query builder 260 provides the query to the data store interface 250 to send to the inventory management server 110 and/or the inventory database 115 to retrieve wire or cable reel information corresponding to the keyword(s) or search string provided by the user 100. In some examples, the query builder 260 builds queries that are useable by the beacons 140 to search wire or cable information stored in memories (e.g., a memory 315) of the beacons 140. In such examples, such queries are processed by the beacons 140 to return requested information to the mobile device 105. In some examples, the query builder 260 generates queries that are able to be processed by the beacons 140, the inventory management server 110 and/or the inventory database 115. In this manner, the beacons 140 can perform searches for information stored locally in the beacons 140, and the inventory management server 110 and/or the inventory database 115 can perform searches for information stored remotely from the mobile device 105 and the beacons 140.

The example reel tracker 215 is provided with the example location resolver 265 to determine geostamp target locations of target reels. For example, when the user 100 seeks a particular one of the reels 135, geostamp location information of the reel 135 may be returned by the inventory management server 110 and/or the inventory database 115. In addition, the example location resolver 265 may receive location information from the example GPS receiver 200 and/or the Bluetooth transceiver 205 to determine the location of the mobile device 105 relative to target locations of target reels sought by the user 100. In some examples, for indoor inventory storage environments, rack information (e.g., rack number and/or rack shelf) may be used instead of or in addition to geostamp location information when associating a physical location with a beacon 140 of a wire or cable reel 135.

The example reel tracker 215 is provided with the example user output interface 270 to provide information to the user 100. For example, the user output interface 270 provides graphical user interfaces, wire or cable information, reel locations, mobile device locations, and/or any other graphical or text information for displaying on a display of the mobile device 105. The example user output interface 270 also provides notifications to be emitted, displayed, or otherwise output by the example alert 230.

Figure 3:
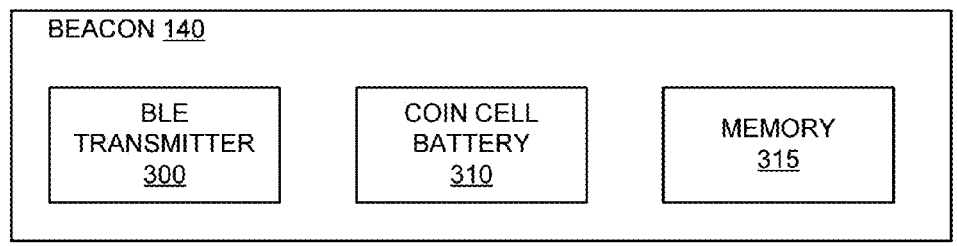
FIG. 3 is the example beacon of FIG. 1 that may be used in the example wire or cable reel tracking system of FIG. 1.

FIG. 3 is the example beacon 140 of FIG. 1. The example beacon 140 includes an example Bluetooth BLE transmitter 300 to generate and transmit the BLE signals 150 (FIG. 1) to be received by the example Bluetooth transceiver 205 (FIG. 2) of the example mobile device 105. The example mobile device 105 uses the BLE signals 150 to determine a relative proximity of the mobile device 105 to the beacon 140. The example beacon 140 also includes an example coin cell battery 310 that is used to power the BLE transmitter 300. In the illustrated example, the example beacon 140 includes an example memory 315 (e.g., a data store) to store information (e.g., wire length, wire type, location, and/or any other type of information) of the wire or cable reel 135. For example, the mobile device 105 may geostamp the beacon 140 by storing in the memory 315 GPS coordinates corresponding to the location of the reel 135 on which the beacon 140 is located. In some examples, the memory 315 may store one or more of the type of information categories shown in FIG. 12 (e.g., one or more of an example reel identifier 1205, an example product name 1210, an example supplier part number 1215, an example detailed material description 1220, an example customer identifier 1225, an example remaining material length 1230, an example beacon attachment status 1235, and example location coordinates 1240).

Figure 4:
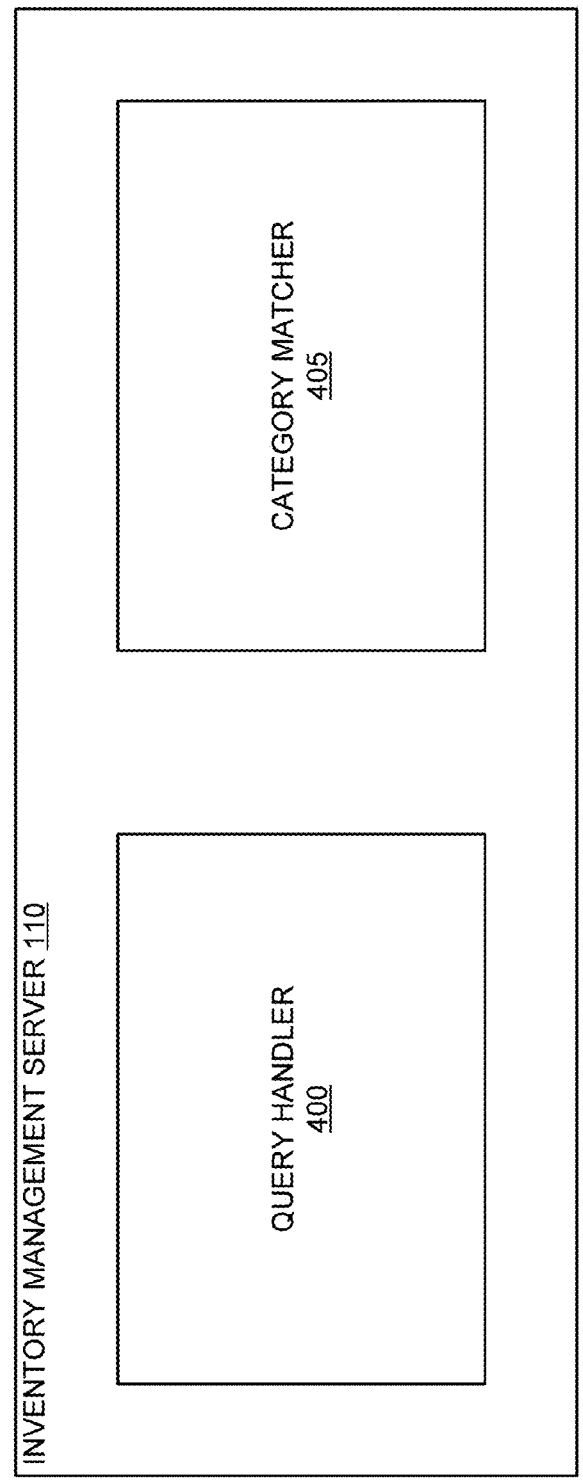
FIG. 4 is the example inventory management server of FIG. 1 that may be used in the example wire or cable reel tracking system of FIG. 1.

FIG. 4 illustrates the example inventory management server 110 of FIG. 1. The inventory management server 110 of the illustrated example includes an example query handler 400 that processes requests from the example mobile device 105 (e.g., queries generated by the example query builder 260 of FIG. 2) and executes a search in the inventory database 115 for requested information (e.g., information/location of a wire or cable reel 135). When a search or an update for specific cable information is requested (e.g., by the user 100) an example category matcher 405 of the inventory management server 110, analyzes the user-provided information and matches the information to a given inventory detail category in the example inventory database 115. When the example category matcher 405 finds a match between the user-provided information and a particular inventory detail category, the query handler 400 returns information relevant to the inventory category to the mobile device 105.

Additionally or alternatively, when a search or an update for specific information is requested (e.g., by the user 100), the reel tracker 215 can also search for the user-provided search information in reel information stored in the beacons 140. An example beacon 140 may, for example, transmit information of the wire or cable reel 135 stored in the memory 315 to the example mobile device 105. The example mobile device 105 may, for example, analyze the example information received from the beacon 140 and provide to the user locations of wire or cable reels 135 that match user-inputted search criteria.

While an example manner of implementing the example mobile device 105, the example beacon 140, and the example inventory management server 110 are illustrated in FIGS. 2-4, one or more of the elements, processes and/or devices illustrated in FIGS. 2-4 may be combined, divided, re-arranged, omitted, eliminated and/or implemented in any other way. Further, the example GPS receiver 200, the example Bluetooth transceiver 205, the example camera 210, the example reel tracker 215, the example alert 230, the example reel identifier interface 240, the example associator 245, the example data store interface 250, the example user input interface 255, the example query builder 260, the example location resolver 265, the example user output interface 270, the example BLE transmitter 300, the example query handler 400, and/or the example category matcher 405 may be implemented by hardware, software, firmware and/or any combination of hardware, software and/or firmware. Thus, for example, any of the example GPS receiver 200, the example Bluetooth transceiver 205, the example camera 210, the example reel tracker 215, the example alert 230, the example reel identifier interface 240, the example associator 245, the example data store interface 250, the example user input interface 255, the example query builder 260, the example location resolver 265, the example user output interface 270, the example BLE transmitter 300, the example query handler 400, and the example category matcher 405 and/or, more generally, the example mobile device 105, the example beacon 140, and the example inventory management server 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GPS receiver 200, the example Bluetooth transceiver 205, the example camera 210, the example reel tracker 215, the example alert 230, the example reel identifier interface 240, the example associator 245, the example data store interface 250, the example user input interface 255, the example query builder 260, the example location resolver 265, the example user output interface 270, the example BLE transmitter 300, the example query handler 400, and/or the example category matcher 405 are hereby expressly defined to include a tangible computer readable storage device or storage disk such as a memory, a digital versatile disk (DVD), a compact disk (CD), a Blu-ray disk, etc. storing the software and/or firmware. Further still, the example mobile device 105, the example beacon 140, and the example inventory management server 110 of FIGS. 2-4 may include one or more elements, processes and/or devices in addition to, or instead of, those illustrated in FIGS. 2-4, and/or may include more than one of any or all of the illustrated elements, processes and devices.

Figure 5:
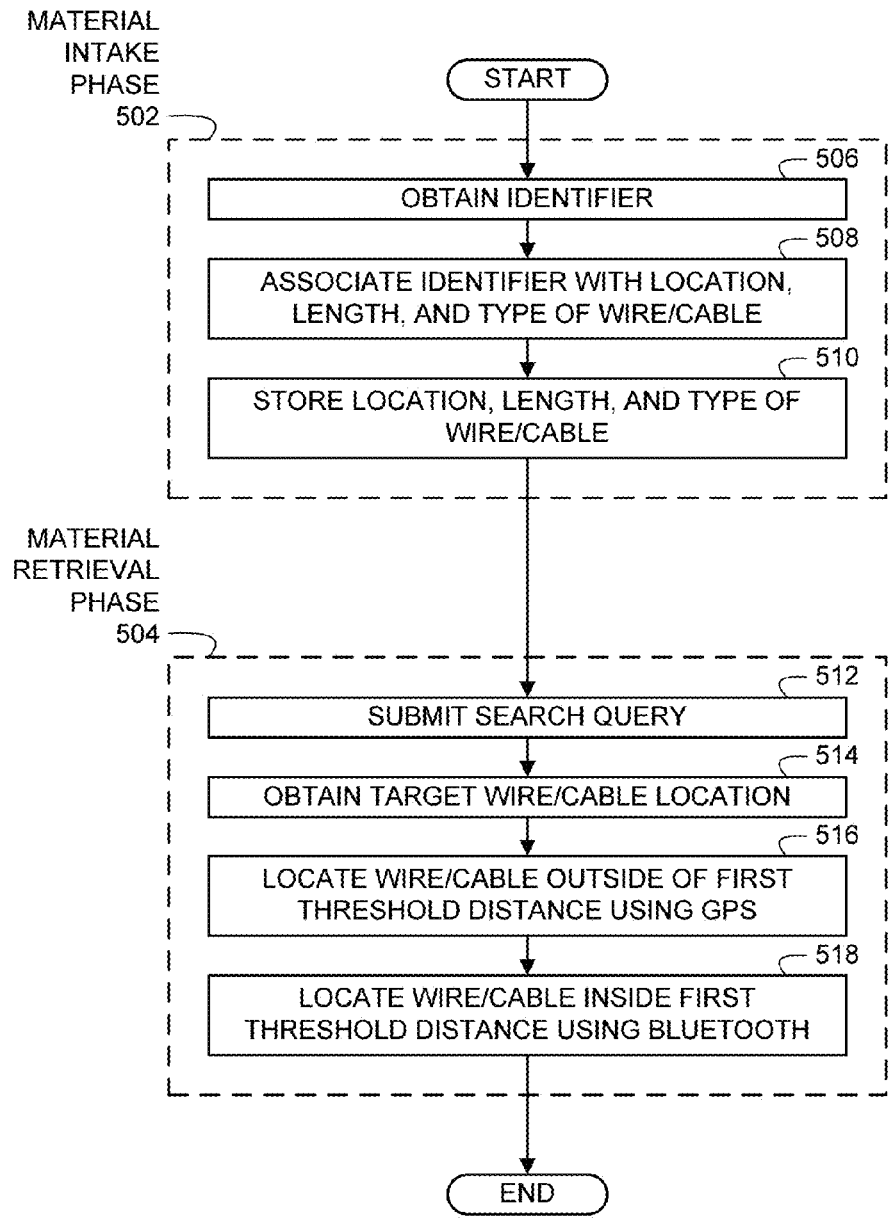
FIG. 5 is a flow chart representative of example machine-readable instructions that may be executed to add characteristics and locations of wire or cable reels to the example inventory management system of FIG. 1 and to search for example wire or cable reels using the inventory management system of FIG. 1.
Figure 20:
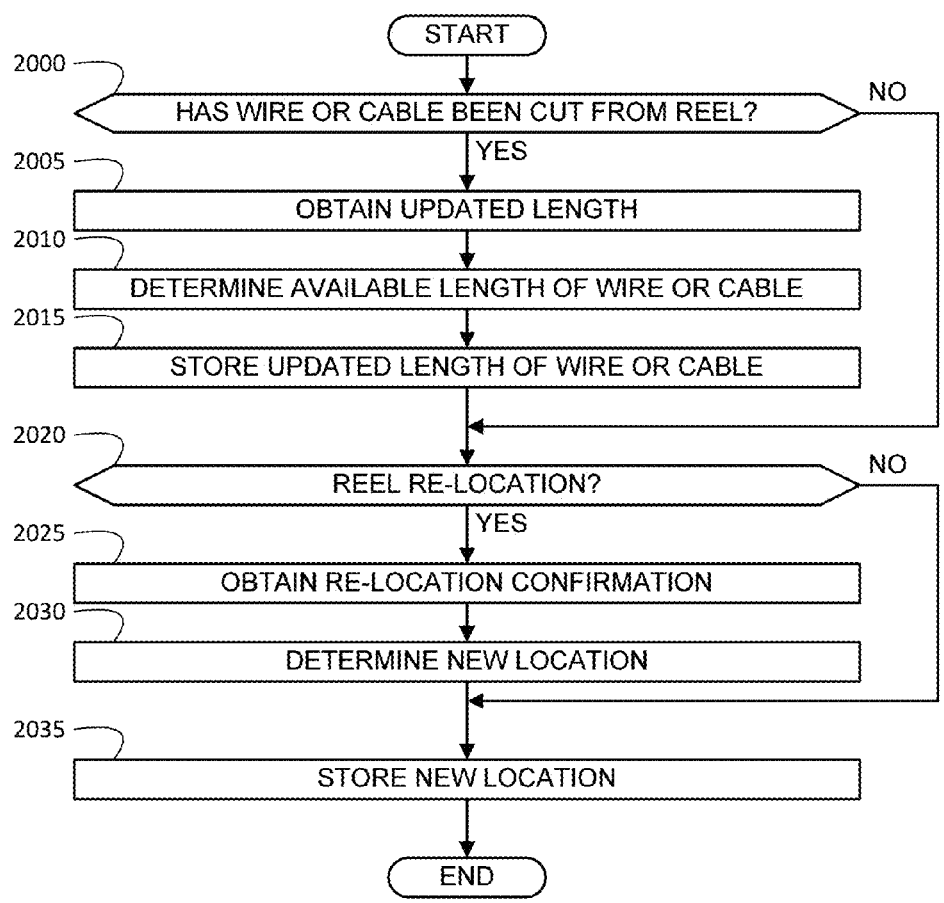
FIG. 20 is a flow chart representative of example machine-readable instructions that may be executed to update inventory information in the inventory database of FIG. 1 following reel relocation or length changes in a particular reel.
Figure 21:
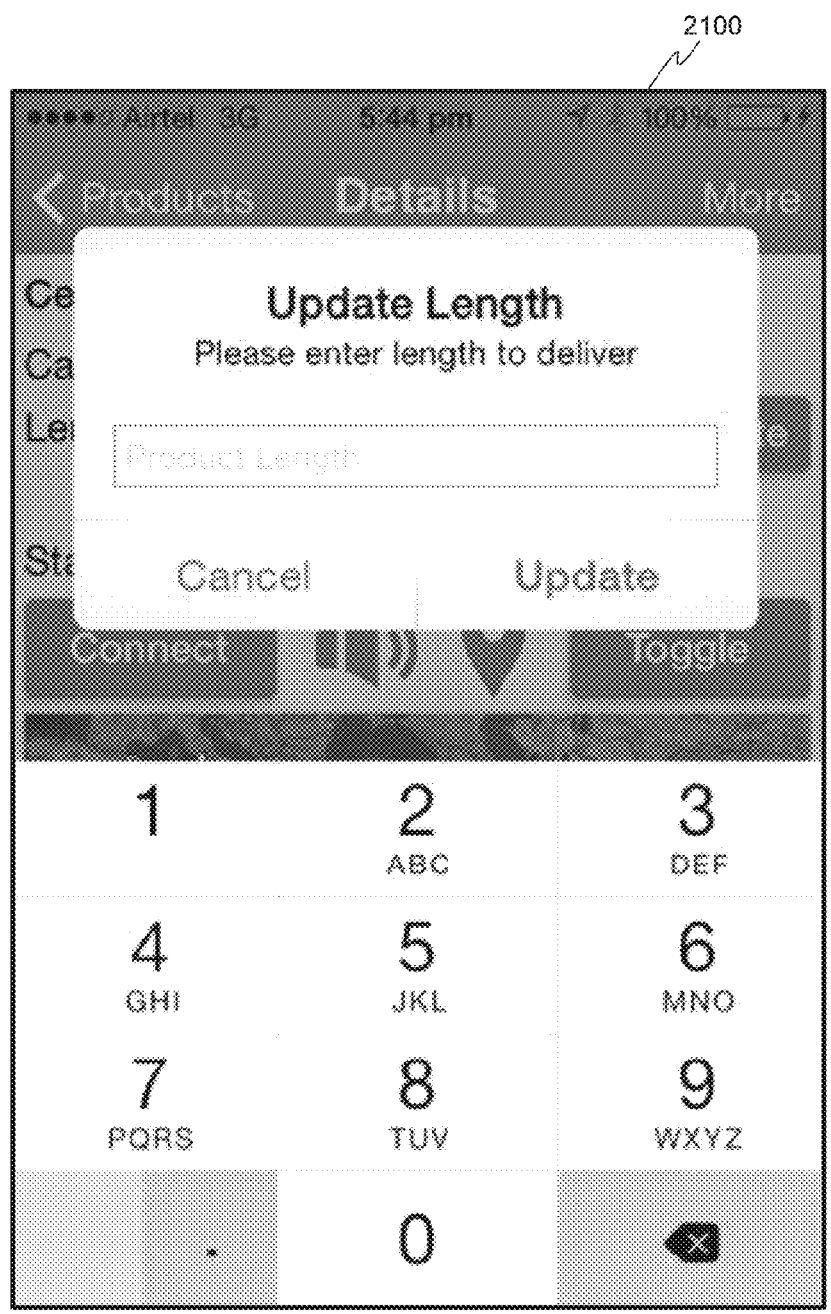
FIG. 21 is an example user interface of the reel tracker in FIG. 2 that may be used to update the length of a wire or cable in a particular reel.
Figure 22:
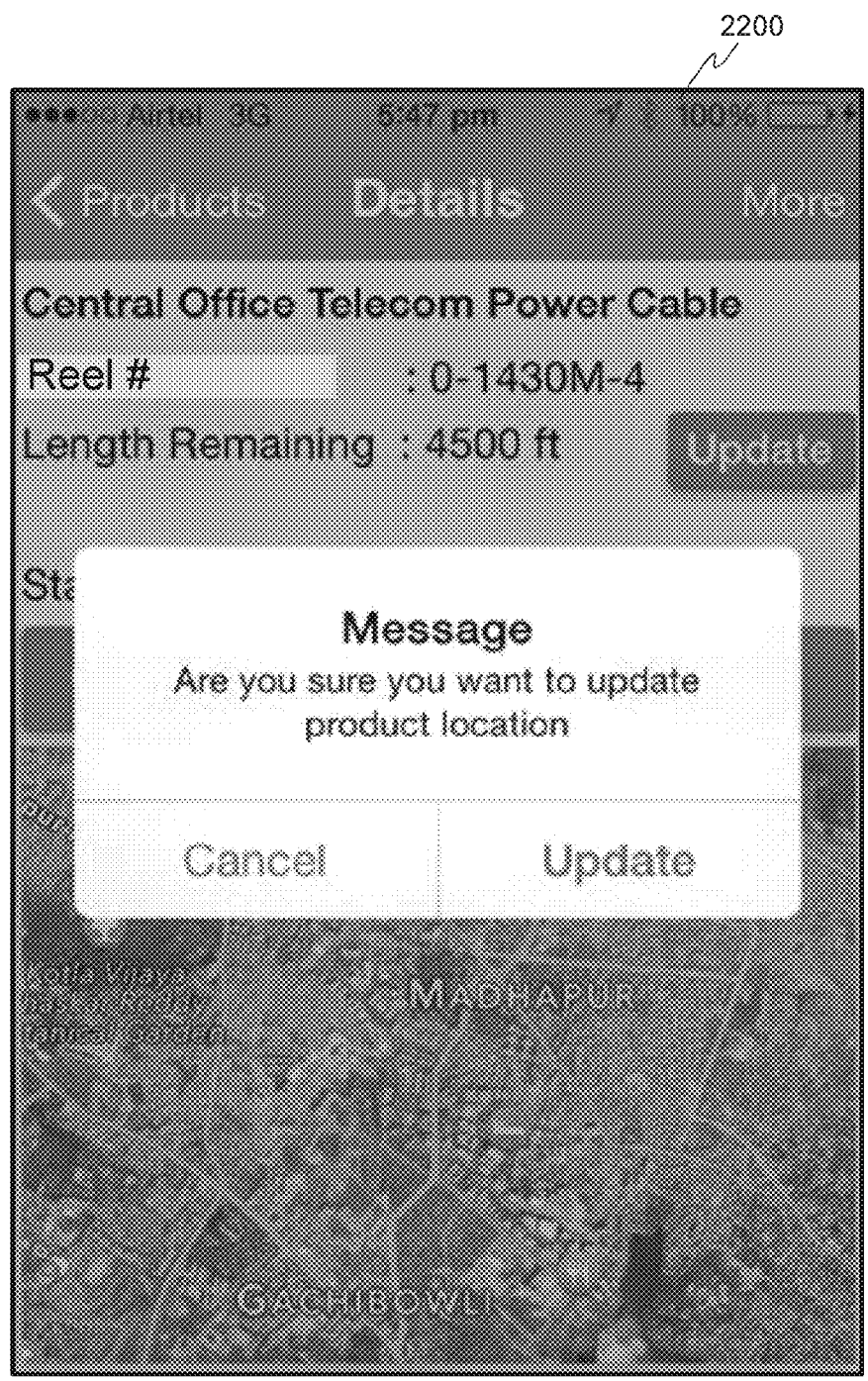
FIG. 22 is an example user interface of the reel tracker in FIG. 2 that may be used to update the location of a particular wire or cable reel.

Flowcharts representative of example machine readable instructions for implementing the example mobile device 105 of FIGS. 1 and 2 are shown in FIGS. 5 and 20. In these examples, the machine readable instructions comprise one or more programs for execution by a processor such as the example processor 225 of FIG. 2 or the example processor 2312 shown in the example processor platform 2300 discussed below in connection with FIG. 23. The programs may be embodied in software stored on a tangible computer readable storage medium such as a CD-ROM, a floppy disk, a hard drive, a digital versatile disk (DVD), a Blu-ray disk, or a memory associated with the example processor 225 or example processor 2312, but the entire programs and/or parts thereof could alternatively be executed by a device other than the example processor 225, 2312 and/or embodied in firmware or dedicated hardware. Further, although the example programs are described with reference to the flowcharts illustrated in FIGS. 5 and 20 many other methods of implementing the example mobile device 105, the example beacon 140, and the example inventory management server 110 may alternatively be used. For example, the order of execution of the blocks may be changed, and/or some of the blocks described may be changed, eliminated, or combined.

As mentioned above, the example processes of FIGS. 5 and 20 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 20 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended.

The example flowchart of FIG. 5 includes two phases shown as an example material intake phase 502 and an example material retrieval phase 504. During the example material intake phase 502, the example mobile device 105 may be used to provide information about a wire or cable reel 135 (FIG. 1) for storing in the inventory database 115 (FIG. 1) in association with an identifier of the wire or cable reel 135. During the example material retrieval phase 504, the example mobile device 105 may be used to retrieve information about a wire or cable reel 135 from the inventory database 115. The example material retrieval phase 504 may occur at any time after the example material intake phase 502. In some examples, the material intake phase 502 and the material retrieval phase 504 may occur at substantially the same time. For example, one user may be inputting a new reel during a material intake phase 502, while at substantially the same time a second user retrieves reel information during a material retrieval phase 504.

Figure 6:
FIG. 6 is an example user interface screen that may be used to implement the example reel tracker of FIG. 2.
Figure 7:
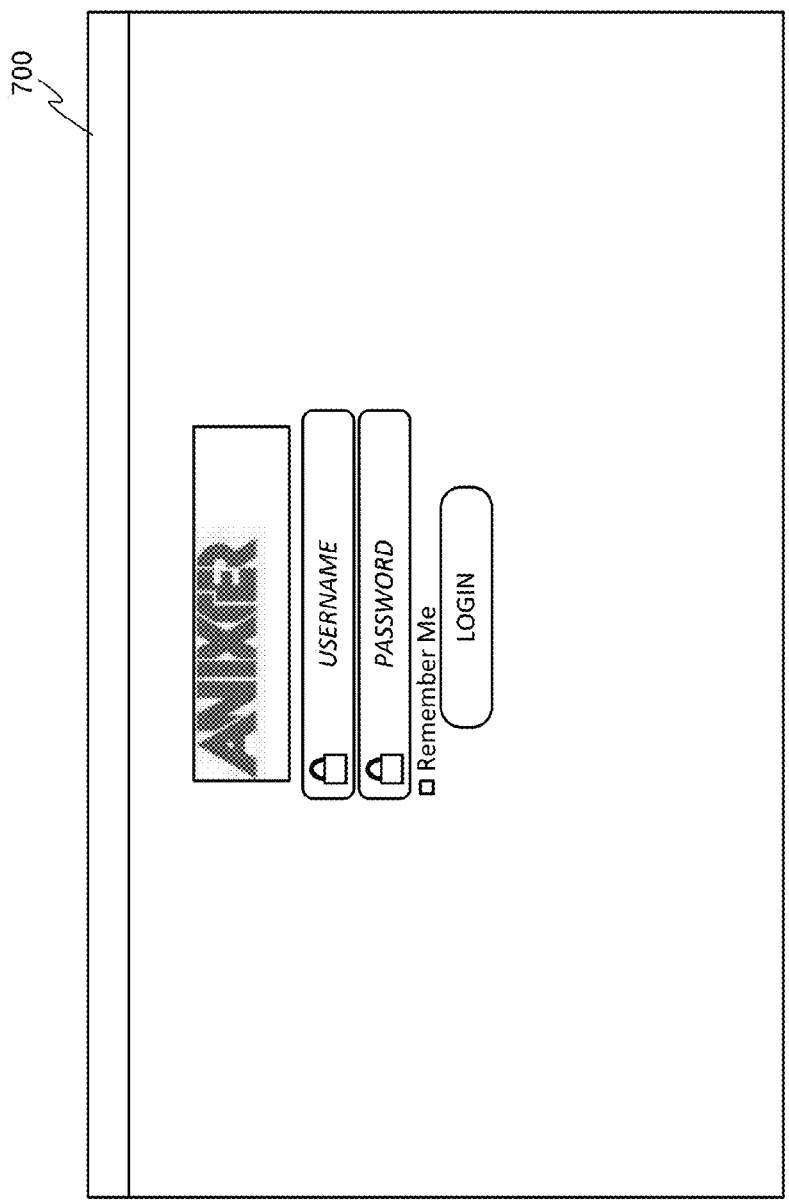
FIG. 7 is an example login user interface that may be used to access and manage wire or cable reel inventory information in the example inventory management server of FIGS. 1 and 4.
Figure 13:
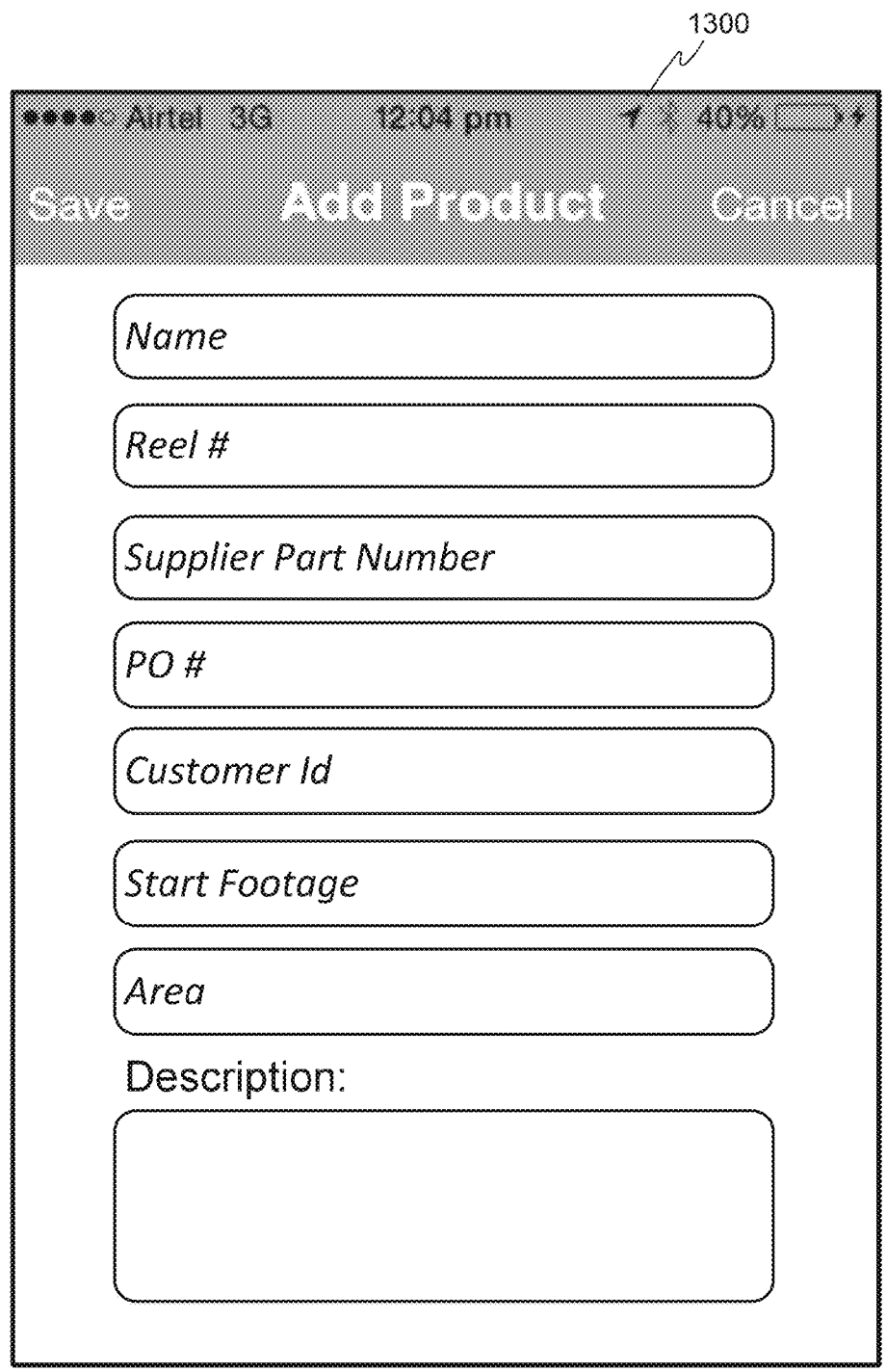
FIG. 13 is an example user interface that may be used to implement the reel tracker of FIG. 2 to add product information about a wire or cable reel in the example inventory database of FIG. 1.
Figure 15:
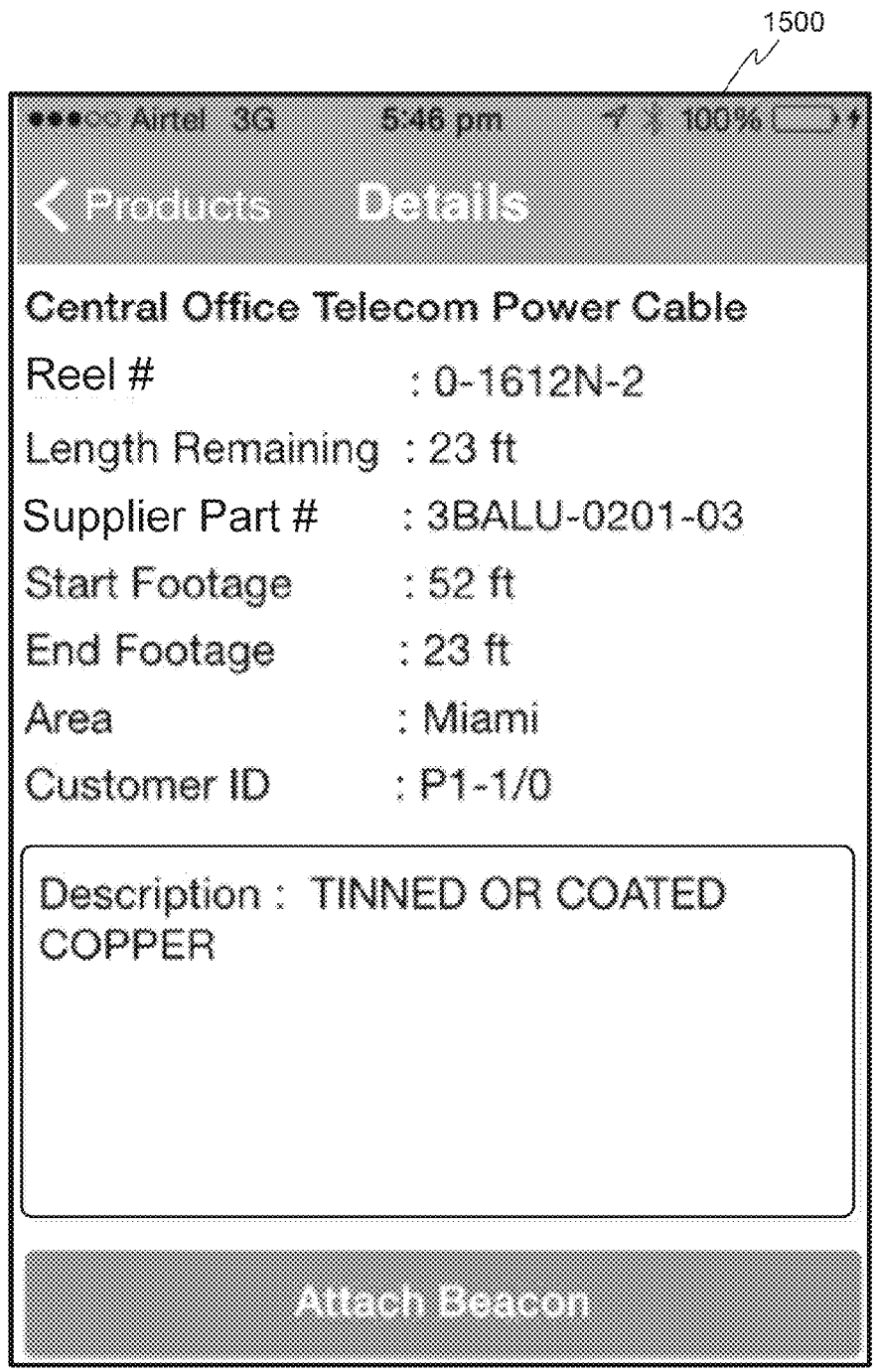
FIG. 15 is an example user interface that may be used to implement the reel tracker of FIG. 2 to associate a beacon and a location with a wire or cable reel.
Figure 16:
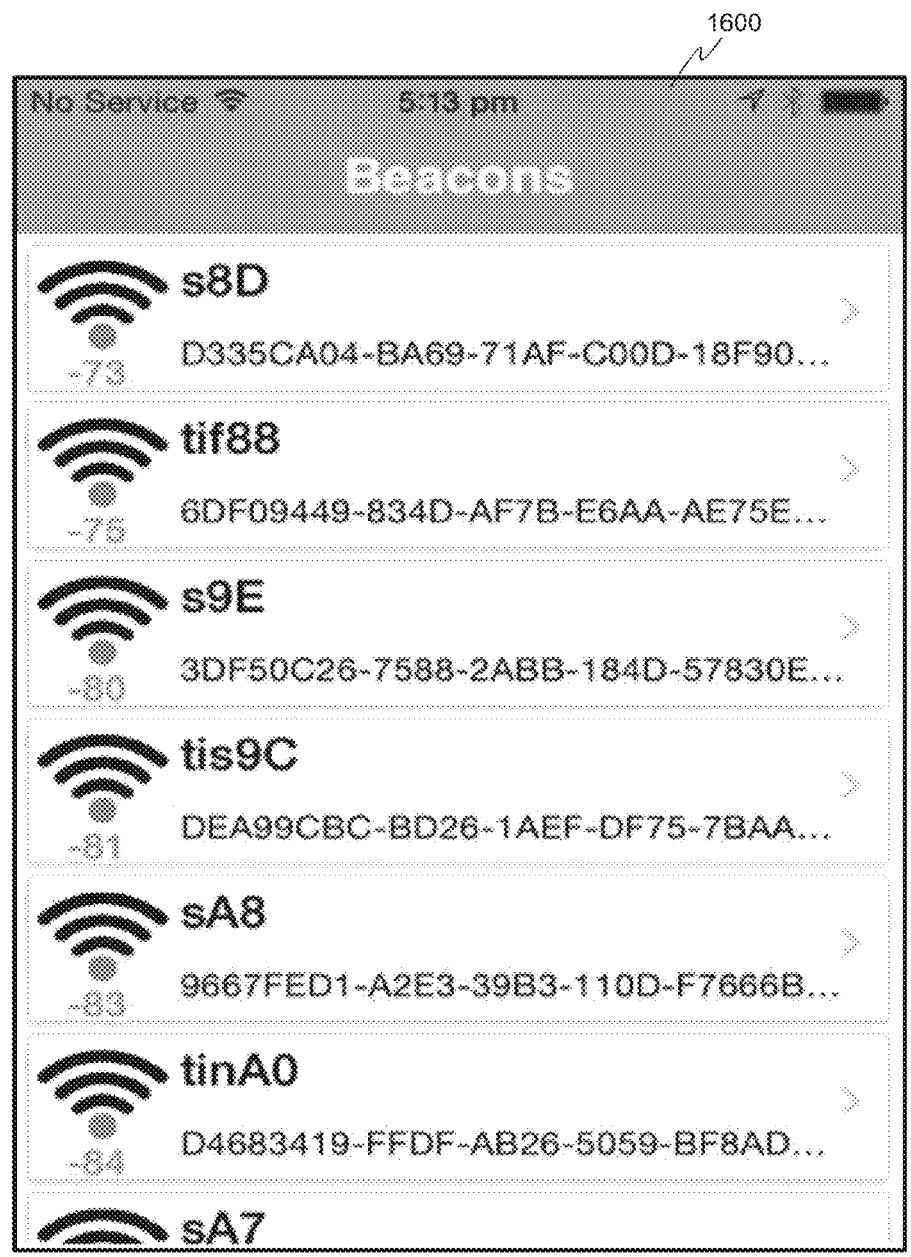
FIG. 16 is an example interface that may be used to implement the reel tracker of FIG. 2 to show nearby beacon tags that may be selected to associate with product details of a wire or cable reel.
Figure 17:
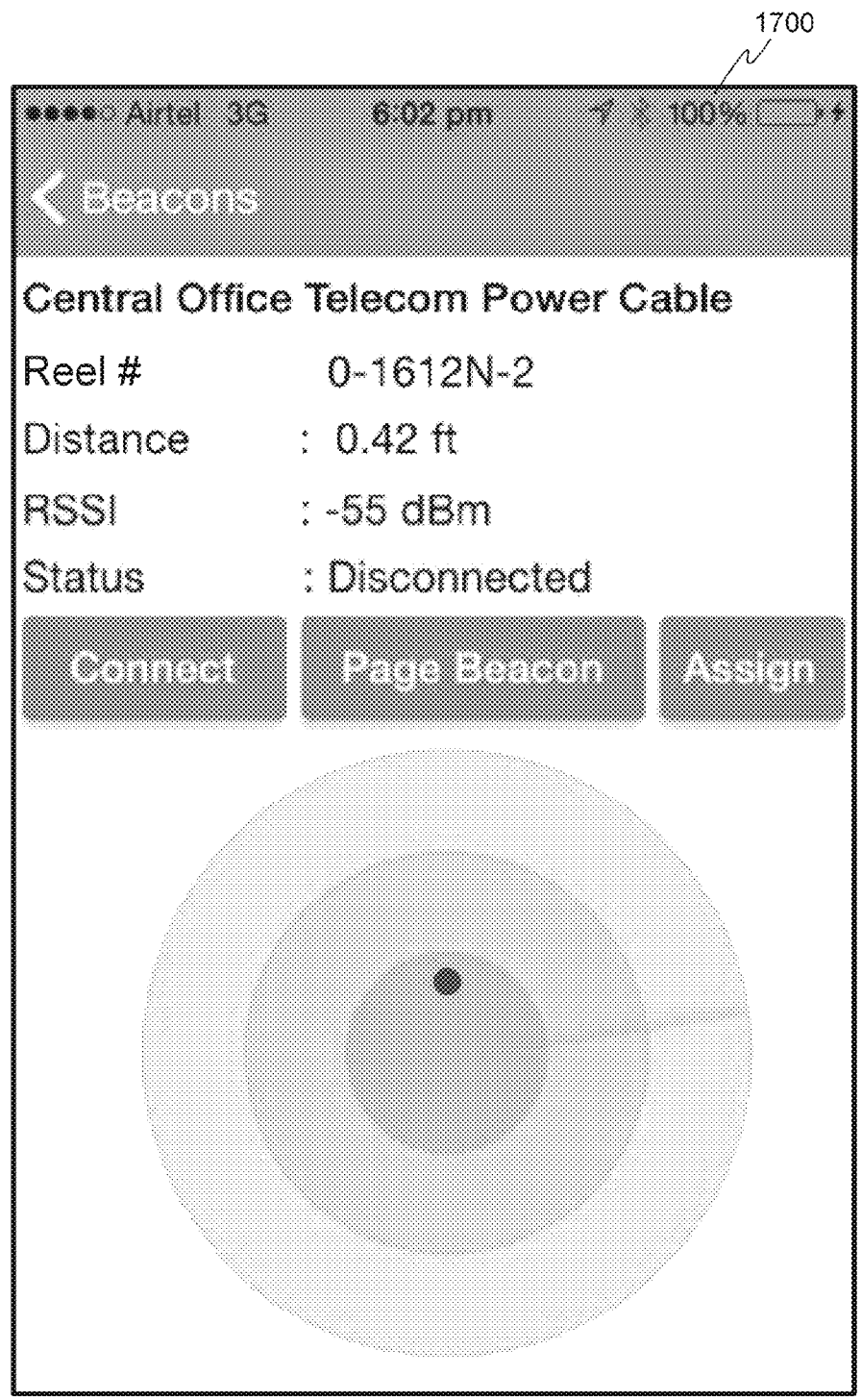
FIG. 17 is an example user interface that may be used to implement the reel tracker of FIG. 2 to find relative locations of nearby beacons associated with wire or cable reels and/or to assign beacons to wire or cable reels.
Figure 18:
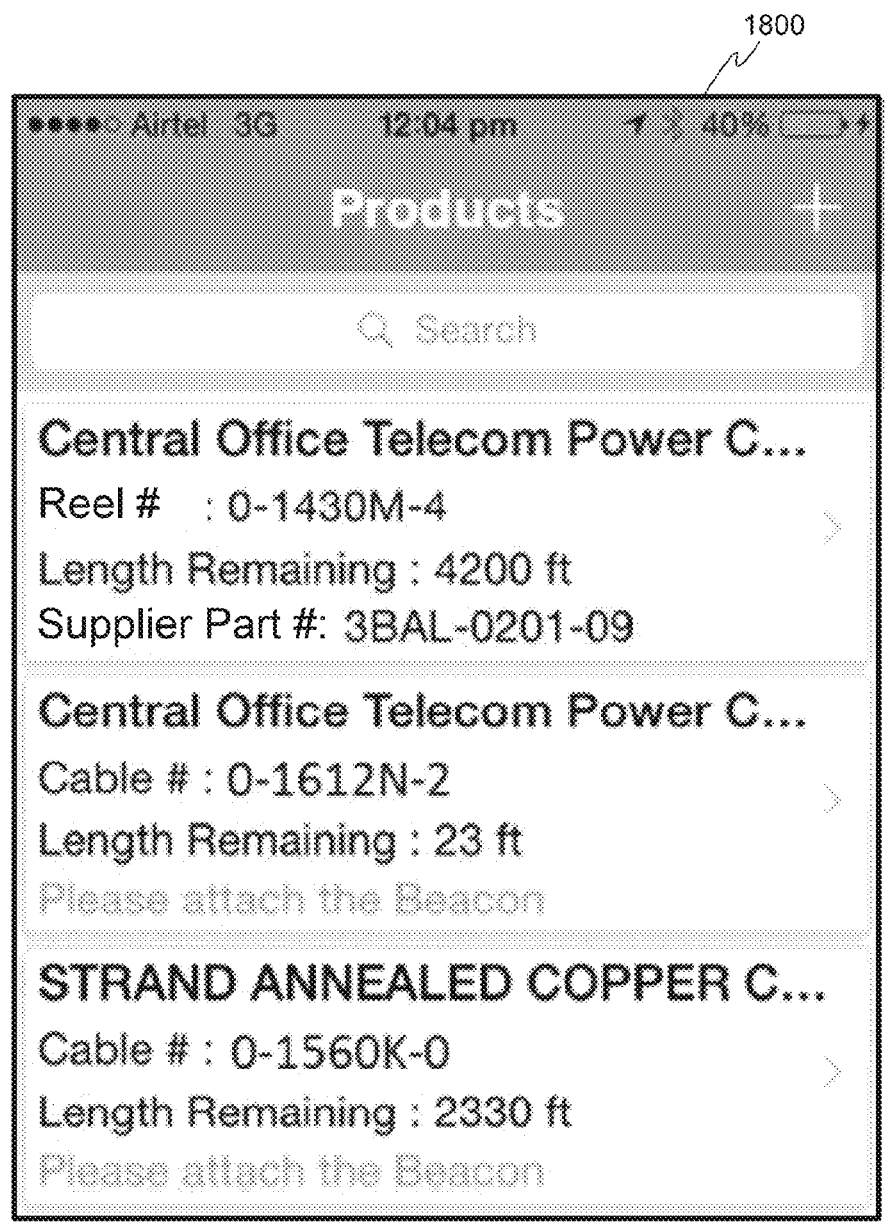
FIG. 18 is an example user interface that may be used to implement the reel tracker of FIG. 2 showing search results of a search for specific product details.
Figure 19:
FIG. 19 is an example user interface that may be used to implement the reel tracker of FIG. 2 to display a map of a location of a wire or cable reel.

The example material intake phase 502 begins at block 506. However, prior to block 506, a user 100 receives permission to use the reel tracker 215 (FIG. 2) to access reel inventory information. For example, FIGS. 6 and 7 depict example user interfaces via which the user 100 may provide login credentials such as a password, etc. For example, an example mobile login interface 600 of FIG. 6 may be presented by the reel tracker 215 via the mobile device 105 to prompt the user 100 for corresponding login credentials. An example desktop login interface 700 of FIG. 7 may be presented by a desktop computer, laptop computer, tablet computer, or the inventory management server 110 of FIG. 1 to prompt the user 100 for corresponding login credentials. The example reel tracker 215 can determine if the user 100 is authorized to use the reel tracker 215. If the example user 100 does not have authorization, the user 100 cannot login to the reel tracker 215. However, if the user 100 is granted authorization, the reel tracker 215 can be accessed. In some examples, administrators can use example user interface 800 of FIG. 8 and example user interface 900 of FIG. 9 to change or update other permissions of users to access wire or cable reel inventory information. Users 100 may also use example user interfaces 1000, 1100, 1200 shown in FIGS. 10, 11, and 12 to manage and edit the inventory information about wire or cable reels 135 in the inventory management server 110. Example inventory category details, depicted in FIG. 12, may include, for example, example reel identifiers 1205, example product names 1210, example supplier part numbers 1215, example detailed material descriptions 1220, example customer identifiers 1225 (e.g., identifiers of customers that purchase cable or wire from a supplier), example remaining material lengths 1230 (e.g., feet, yards, meters, and/or any other length unit), example beacon attachment status 1235, and example location information 1240. In addition, reel data for storing in the inventory database 115 can be entered via the example interfaces, depicted in FIGS. 13 and 14. For example, an example Add Product user interface 1300 of FIG. 13 may be presented by the reel tracker 215 on the mobile device 105 to receive user-input wire or cable information. An example inventory details user interface 1400 of FIG. 14 may be displayed by a desktop computer, laptop computer, tablet computer, or the inventory management server 110 of FIG. 1 to receiver user-input wire or cable information. An example material details user interface 1500 of FIG. 15 may be presented by the example reel tracker 215 via the mobile device 105 to prompt the example user 100 to attach or associate a beacon 140 to a newly added product (e.g., a newly added one of the reels 135).

In the illustrated examples, reels that hold the same type of cable or wire are added in association with the same supplier part number (e.g., the supplier part numbers 1215 of FIG. 12) but are assigned different reel IDs (e.g., the reel identifiers 1205 of FIG. 12). In this manner, reels that hold the same type of cable or wire but have different lengths and/or are stored at different locations can be uniquely identified. In the illustrated example of FIG. 12, reels 135 having different reel IDs (e.g., the reel identifiers 1205) of '0-1430M-4' and '0-1612N-2' have the same supplier part number (e.g., the supplier part numbers 1215) of '38AL-0201-09'. Thus, even though the same type of cable or wire (e.g., supplier part number '38AL-0201-09') is on those reels 135, the reels 135 can be identified separately based on their different reel IDs (e.g., the reel identifiers 1205) to separately track their respective lengths (e.g., 4498 length units and 23 length units) and their respective locations (e.g., location coordinates (37.419698,−121.897207) and (32.931647,−97.165514)).

The example material intake phase 502 starts at block 506. At block 506, the example reel tracker 215 obtains an identifier 145 (FIG. 1) of the example reel 135. For example, the reel tracker 215 may obtain the reel identifier 138 (FIG. 1) from the camera 210 (FIG. 2) based on scanning or imaging a barcode 145 (FIG. 1) corresponding to the reel identifier 138 located on the example reel 135. Alternatively, the example reel tracker 215 may obtain the reel identifier 138 based on wireless communications between the Bluetooth transceiver 205 of the mobile device 105 and the beacon 140 of FIG. 1. At block 508, the example reel tracker 215 associates the reel identifier 138 with a physical location of the beacon 140 and a length and type of wire or cable of the reel 135. For example, the reel identifier interface 240 (FIG. 2) may obtain the reel identifier 138 from the camera 210 and/or the Bluetooth transceiver 205. In addition, the location resolver 265 (FIG. 2) may receive GPS location information from the GPS receiver 200 to determine a location of the reel 135 relative to the mobile device 105. In the illustrated example, during the material intake phase 502, the mobile device 105 is located at the same location as the reel 135 being entered into the inventory management server 110. As such, when a physical location is determined by the mobile device 105 for use at block 508, such physical location corresponds to the location of the reel 135. For example, the location resolver 265 may use GPS location coordinates from the GPS receiver 200 when the mobile device 105 is outdoors to determine a physical location of the mobile device 105, and thus, the physical location of the reel 135. In some examples, when the reel 135 and its associated beacon 140 are indoors where the mobile device 105 is unable to receive GPS signals, the GPS receiver 200 uses the last known location it was able to resolve before GPS signal reception was lost. In such examples, the most recently resolved GPS location is indicated by the GPS coordinates that the GPS receiver 200 determined before entering the indoor environment, or facility, in which the reel 135 and beacon 140 are located. As such, the last known GPS location provided by the GPS receiver 200 is the geographic location of the facility in which the reel 135 and beacon 140 are located. To facilitate the information association of block 508, the example reel identifier interface 240 provides the identifier of the reel 135 to the associator 245, and the example location resolver 265 provides the physical location to the associator 245. In this manner, the example associator 245 can associate the identifier and the physical location of the reel 135 and its associated beacon 140 with the length and type of wire or cable of the reel 135. In some examples, the user 100 is prompted via the example user interface of FIG. 15 to associate a beacon 140 and a location with a wire or cable reel 135 by attaching the beacon 140. For example, a beacon attaching process refers to a creating a logical binding in the inventory management server 110 between a beacon 140 and its corresponding reel 135. In some examples, the user output interface 270 (FIG. 2) may present an example nearby beacons user interface 1600 of FIG. 16 via the mobile device 105 to provide identities of numerous nearby beacons 140 that the user 100 may select for associating with product details of a newly added wire or cable reel. In some examples, the user output interface 270 displays an example beacon ranging user interface 1700 of FIG. 17 for use by the user 100 in finding an selecting a target beacon 140 to "assign" to the newly added wire or cable reel.

At block 510 of the example material intake phase 502 depicted in the example program of FIG. 5, the data store interface 250 (FIG. 2) stores the location, length and type of wire or cable reel 135. In the illustrated example, the data store interface 250 sends the location, length and type of the wire or cable reel 135 to the beacon 140 to be stored in the memory 315 of the beacon 140. Additionally or alternatively, the data store interface 250 sends the location, length and type of the reel 135 to the inventory management server 110 to store in the inventory database 115. For example, the mobile device 105 may communicate information from the reel tracker 215 to the inventory management server 110 via protocols such as, for example, HTTP, TCP, and/or IP. The inventory management server 110 can, for example, store a reel identifier 138 corresponding to the beacon 140, location information, and characteristic information of the cable or wire reel 135 in the inventory database 115. As such, in some examples, the reel tracker 215 synchronizes the information stored in the beacon 140 with the inventory database 115.

After wire or cable reel 135 location, length and type are stored in the memory 315 of the beacon 140 and/or in the inventory database 115, an example user 100 can perform a search during the example material retrieval phase 504 to find the physical location of the reel 135.

The example material retrieval phase 504 begins in block 512, at which the data store interface 250 submits a user search query. For example, the user search query may be generated by the query builder 260 (FIG. 2) based on keywords or search strings obtained from a user via the user input interface 255 (FIG. 2). In some examples, the data store interface 250 submits the user search query to the inventory management server 110. In this manner, the example reel tracker 215 can initiate a search in the inventory database 115 to search for information such as a target location of a target reel 135 related to the example inventory categories shown in FIG. 12. Additionally or alternatively, the example data store interface 250 can perform a search by applying the user search query to information stored in the beacons 140 of nearby reels 135. For example, the reel tracker 215 can analyze the stored reel information provided by the beacons 140 in the BLE signals 150 to determine which nearby wire or cable reels 135 have characteristics matching criteria provided in the user search query. For example, the search may be based on a wire or cable length, a wire or cable type, and/or any other type of information categories shown in FIG. 12.

When the search results are determined, the example reel tracker 215 obtains a target location of a wire or cable reel 135 (block 514). For example, the data store interface 250 may obtain a physical location of the target reel 135 sought by the user 100 from the network management server 110. Alternatively, the location resolver 265 determines a physical location of the target reel 135 based on the example BLE signals 150 if the mobile device 105 is within sufficiently close range to the example beacon 140 to which the search results correspond. In some examples, the user output interface 270 displays an example products listing user interface 1800 of FIG. 18 via the mobile device 105 to present a plurality of search results to the user 100. In this manner, the user 100 can select the reel 135 that he or she wishes to locate. Using this information, the reel tracker 215 can guide the user 100 toward the location of the desired reel 135.

In the illustrated example of FIG. 5, when the example user 100 is, for example, further away from the target location than the first threshold distance 160 (FIG. 1) (e.g., a number of feet, yards, or meters exceeding the first threshold distance 160), the physical location of a target reel 135 is determined using the GPS receiver 200 (block 516). For example, the location resolver 265 may communicate with the GPS receiver 200 to determine whether the mobile device 105 is further from the target location than the first threshold distance 160. In some examples, the user output interface 270 displays the GPS-based location of the desired reel 135 using an example location details user interface 1900 of FIG. 19. In this manner, the reel tracker 215 can graphically display the location of the user 100 and the reel 135 to guide the user 100 to the physical location of the reel 135. When the user 100 arrives at the first threshold distance 160, the reel tracker 215 ceases use of the GPS receiver 200, and the location resolver 265 uses information from the Bluetooth transceiver 205 to identify BLE signals 150 indicative of the location of the target reel 135 (block 518). For example, the location resolver 265 may determine when the mobile device 105 is within the first threshold distance 160 to the target location based on GPS information from the GPS receiver 200. The example location resolver 265 may determine that GPS information from the GPS receiver 200 indicates a location that is within the first threshold distance 160 to the target location, or the location resolver 265 may determine that GPS information from the GPS receiver 200 indicates loss of GPS reception such that the mobile device 105 is at an indoor location (e.g., within the first threshold distance 160 to the target location) at which a target reel 135 is located. In the illustrated example, when the location resolver 265 switches to using the Bluetooth transceiver 205 to locate the target reel 135, the location resolver 265 may obtain RSSI (Received Signal Strength Indicator) signal strength information from the Bluetooth transceiver 205 corresponding to the BLE signals 150 to determine proximity between the mobile device 105 and the target reel 135.

In some examples, to implement block 518, the user output interface 270 displays a radar interface view of its location relative to a target reel 135 location. The reel tracker 215 uses this radar view when in close proximity to the reel 135 to continue navigation toward the target reel 135. The radar view is generated using, for example, the location resolver 265 and the Bluetooth transceiver 205 to analyze BLE signals 150 from the BLE transmitter 300 of the beacon 140.

In some examples, when the mobile device 105 is within a second threshold distance 165 of the reel 135, the user output interface 270 operates the example alert 230 to, for example, generate notifications (e.g., visual, audible, and/or vibratory) that intensify as the example mobile device 105 moves closer to the reel 135. In this manner, the alert 230 can assist the example user 100 to find the exact location of the reel 135.

The example program of FIG. 20 corresponds to an example material update phase after the user 100 has successfully navigated to the beacon 140 of a desired reel 135. The example program begins at block 2000 at which the user input interface 255 (FIG. 2) receives information indicative of whether an example user 100 has cut and/or obtained cable or wire from the reel 135. If the reel tracker 215 determines that the user 100 has cut and/or obtained wire from the reel 135 (block 2000), the example user input interface 255 obtains updated length information (block 2005) via, for example, user input from the user 100. For example, the user output interface 270 may display an example update length user interface 2100 of FIG. 21 via the mobile device 105 to prompt the user 100 to input the cut length taken from the target reel 135. In this manner, the reel tracker 215 can use the cut length from the update length user interface 2100 to update the length of a wire or cable in a particular reel 135.

At block 2010 of FIG. 20, the example reel tracker 215 determines the remaining available length of wire or cable on the reel 135 based on user-input data. For example, the reel tracker 215 can determine the remaining length by subtracting the cut length obtained via the update length user interface 2100 from a previous length of wire or cable on the reel 135. At block 2015, the example data store interface 250 stores the updated remaining wire or cable length in the memory 315 (FIG. 3) of the beacon 140 and/or in the inventory database 115.

After the data store interface 250 stores the updated remaining wire or cable length at block 2015, or the reel tracker 215 determines at block 2000 that wire or cable has not been cut and/or obtained from the reel 135, the reel tracker 215 determines whether the reel 135 has been or will be re-located to a different location (block 2020). For example, user output interface 270 may present a question via the mobile device 105 to obtain such information from the user 100 via a user interface. If the example reel tracker 215 determines that the reel 135 has been or will be re-located, the user output interface 270 requests a re-location confirmation (block 2025) to update the location of a particular wire or cable reel 135. For example, the user output interface 270 can display the re-location confirmation user interface 2200 of FIG. 22 via the mobile device 105 to prompt the user 100 to confirm whether to update a physical location of the reel 135 in the inventory database 115. At block 2030, the example location resolver 265 (FIG. 2) determines the location of the beacon 140. For example, the location resolver 265 can use the location of the example mobile device 105 as determined using the GPS receiver 200. The example location resolver 265 determines the location coordinates of the example mobile device 105 that are closely located to the exact location of the beacon 140. If, for example, the inventory storage environment is indoors, and the GPS receiver 200 is incapable of accurately determining the exact physical location of the beacon 140 due to not having GPS signal reception, the location resolver 265 can, for example, use the last known GPS coordinates determined by the GPS receiver 200 before entering the facility in which the reel 135 and associated beacon 140 are located. In this manner, the associator 245 (FIG. 2) can associate the GPS coordinates of the facility with the reel 135. In the illustrated example, the data store interface 250 (FIG. 2) stores the updated location information in association with the corresponding beacon 140 and the example reel 135 in the memory 315 of the beacon 140 and/or in the inventory database 115 (block 2035). Also, in some examples, for each subsequent update to characteristics of an example reel 135, a new reel identifier 138 can be stored in the memory 315 of the beacon 140 and/or in the inventory database 115 containing timestamp information. The time stamped identification number can be used to identify the history of activity on a particular reel 135.

Figure 23:
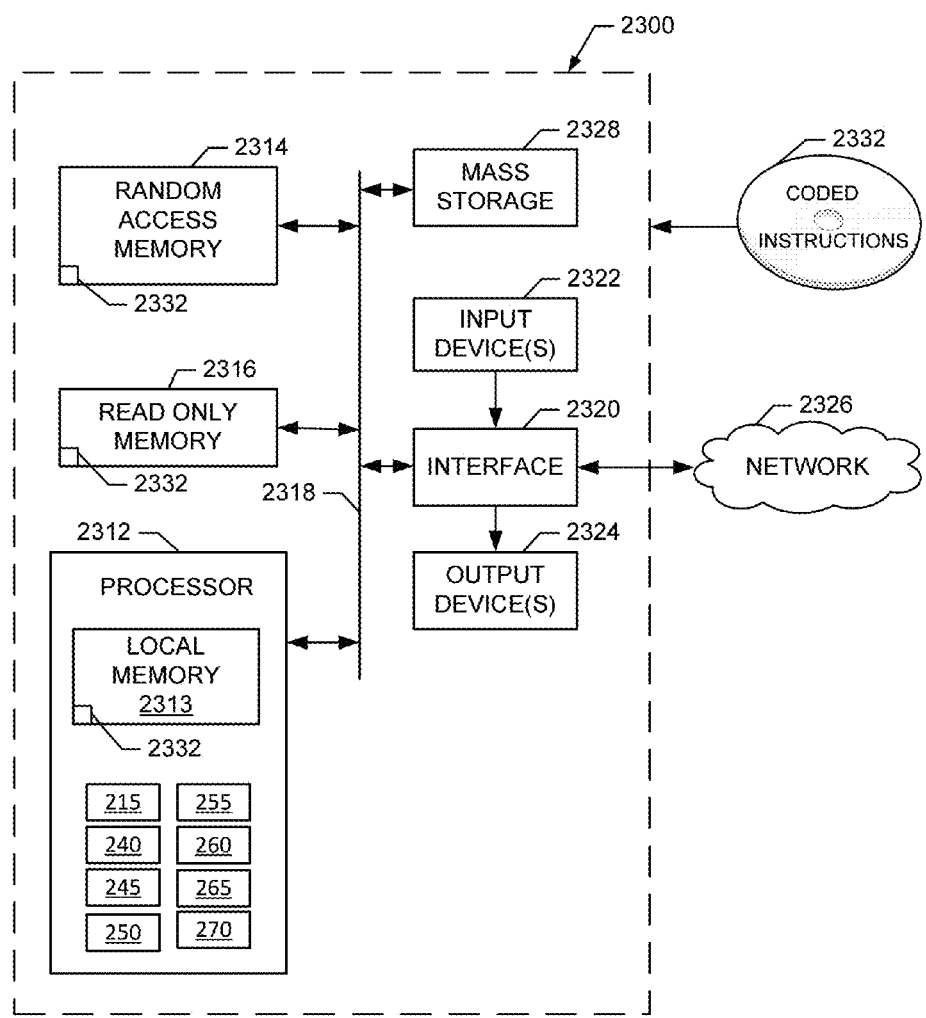
FIG. 23 is an example processor platform that may be used to execute the example machine-readable instructions of FIGS. 5 and 20 to implement the example mobile device of FIG. 2 in accordance with the teachings of this disclosure.

FIG. 23 is a block diagram of an example processor platform 2300 capable of executing the example instructions of FIGS. 5 and 20 to implement the mobile device 105 of FIGS. 1 and 2. The processor platform 2300 can be, for example, a mobile device (e.g., a cell phone, a smart phone, a tablet such as an iPad™), a computer, or any other suitable computing device.

The processor platform, 2300, of the illustrated example includes a processor 2312. The processor 2312 of the illustrated example is hardware. For example, the processor 2312 can be implemented by one or more integrated circuits, logic circuits, microprocessors or controllers from any desired family or manufacturer. In the illustrated example, the processor 2312 implements one or more of the reel tracker 215, the reel identifier interface 240, the associator 245, the data store interface 250, the user input interface 255, the query builder 260, the location resolver 265, and/or the user output interface 270 of FIG. 2.

The processor 2312 of the illustrated example includes a local memory 2313 (e.g., a cache). The processor 2312 of the illustrated example is in communication with a main memory including a volatile memory 2314 and a non-volatile memory 2316 via a bus 2318. The volatile memory 2314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2316 may be implemented by flash memory and/or any other desired type of memory device. Access to the main memory 2314, 2316 is controlled by a memory controller.

The processor platform, 2300, of the illustrated example also includes an interface circuit 2320. The interface circuit 2320 may be implemented by any type of interface standard, such as an Ethernet interface, a universal serial bus (USB), and/or a PCI express interface.

In the illustrated example, one or more 2322 input devices are connected to the interface circuit 2320. The input device(s) permit(s) a user to enter data and commands into the processor 2312. The input device(s) can be implemented by, for example, a camera (still or video) (e.g., the camera 210 of FIG. 2), a keyboard, a button, a touchscreen, a track-pad, and/or a voice recognition system.

One or more output devices 2324 are also connected to the interface circuit 2320 of the illustrated example. In the illustrated example, the output devices 2324 include visual, audible, and/or vibratory devices to implement the alert 230 of FIG. 2. In addition, the output devices 2324 can include, for example, display devices (e.g., a light emitting diode (LED), an organic light emitting diode (OLED), a liquid crystal display, a cathode ray tube display (CRT), a touchscreen, etc.). The interface 2320 of the illustrated example, thus, typically includes a graphics driver card, a graphics driver chip or a graphics driver processor.

The interface circuit 2320 of the illustrated example also includes a communication device such as a transmitter, a receiver, a transceiver, a modem and/or network interface card to facilitate exchange of data with external machines (e.g., computing devices of any kind) via a network 2326 (e.g., an Ethernet connection, a digital subscriber line (DSL), a telephone line, coaxial cable, a cellular telephone system, etc.).

The processor platform 2300 of the illustrated example also includes one or more mass storage devices 2328 for storing software and/or data. Examples of such mass storage devices 2328 include floppy disk drives, hard drive disks, compact disk drives, Blu-ray disk drives, RAID systems, and digital versatile disk (DVD) drives.

The example coded instructions 2332 of FIGS. 5 and 20 may be stored in the mass storage device 2328, in the volatile memory 2314, in the non-volatile memory 2316, and/or on a removable tangible computer readable storage medium such as a CD or DVD.

From the foregoing, it will be appreciated that the above disclosed methods, apparatus and articles of manufacture facilitate inventory management and location tracking of wire or cable reels. While RFID tags require passing proximate a sensor to signal a location change and require a grid system implementation to extend tracking range, examples disclosed herein using beacons 140 with BLE technology do not require on-site set up of signal strengthening/relaying infrastructure. In some examples, BLE beacons 140 can remain stationary and be detected by a handheld mobile device 105 from over 100 feet away. In addition, examples disclosed herein use BLE beacons 140 to store location information indicative of their locations and synchronize such location information with the inventory database 115. In this manner, a mobile device 105 may locate a wire or cable reel by searching the inventory database 115 and/or by querying its beacon 140 when the mobile device is sufficiently close to the wire or cable reel. Additionally, because the BLE beacon 140 stores characteristics of its wire or cable, the mobile device 105 can access such wire or cable characteristics from the beacon 140 and/or from the inventory database 115.

Other example advantages of examples disclosed herein include that the example reel tracker 215 (FIG. 2) may be implemented as an application (e.g., a mobile application for a mobile operating system such as the Apple iOS operating system, the Google Android operating system, the BlackBerry operating system, or any other operating system) that can locate items outdoors (e.g., with distance ranges up to the size of a football field (100 yards×50 yards) or larger) or indoors within a building. Examples disclosed herein may also be used to store material inventory information in a cloud to facilitate granting access to contractors and other users. Examples disclosed herein are scalable to job sites of different sizes by allowing intake and/or removal of numerous wire or cable reels to/from inventory. Examples disclosed herein may use beacons attached to reels to intake characteristics of the reels via mobile devices. Examples disclosed herein facilitate searching a product's description or part number to find an item. Examples disclosed herein facilitate geostamping all parts/beacons identified on a map.

Examples disclosed herein may be used to customize data entry fields to associate different types of information to beacons and part numbers of wire or cable reels. Examples disclosed herein provide users with inventory management features to modify quantities of parts (e.g., quantities of reels and lengths of wire or cable on those reels). Examples disclosed herein also provide a database of wire or cable reel information so that the database of information can be exported for use in, for example, auditing, reporting, or analytics purposes. Examples disclosed herein also provide a "zero-in" feature that is used to emit proximity alerts (e.g., audible, visual, vibratory, etc.) for a beacon when the user is within a particular distance (e.g., 15 feet) of the desired beacon.

Examples disclosed herein facilitate administration of customer information on inventory management servers, and provide authentication mechanisms for authenticating users to access the inventory management servers. Examples disclosed herein also provide mobile and desktop interfaces that provide rich user experiences that make it relatively easier than prior techniques to enter material inventory information into inventory management servers.

Example advantages of the inventory management system disclosed herein include the capability of using iBeacons attached to multiple reels in an inventory storage yard for tracking and updating locations and information about the multiple reels. Examples disclosed herein facilitate creating an inventory map by performing a search for a part, storing a reel identifier and geostamping the part location using a mobile app. For indoor inventory storage environments, rack information may be stored instead of the geostamp location information when associating a physical location with a beacon of a wire or cable reel. Examples disclosed herein facilitate using a reel tracker to search and locate a part when a user enters an inventory storage yard. The reel tracker can be used to direct the technician to a target reel using geostamp information. As the technician gets closer, a beacon on the target reel is detected by the reel tracker to guide the technician to the exact spot at which the target reel is located.

Other example advantages of the example inventory management system disclosed herein also include looking up part number details by accessing the current inventory system or by manually entering the reel part details. In addition, the example inventory management system disclosed herein facilitates geostamping iBeacon UDID's (identifier information) and material/parts information of reels. In addition, example disclosed herein facilitate obtaining reel identifiers by scanning barcodes, QR codes, text, symbols or other indicia on reels to identify the reels.

Example methods are disclosed to track wire or cable inventory in an inventory storage environment using an application on a mobile device. In such example methods, during a material intake phase, a mobile device: obtains an identifier of a wire or cable reel; associates the identifier of the wire or cable reel with a physical location of the wire or cable reel in the inventory storage environment, a length of a wire or cable on the wire or cable reel, and a type of the wire or cable on the wire or cable reel; and stores the physical location, the length, and the type at a data store separate from the mobile device. In such example methods, during a material retrieval phase, the mobile device: receives a target location in response to a search query, the target location corresponding to the physical location of the wire or cable reel in the inventory storage environment, and the search query being based on one or more user-provided wire or cable characteristics; locates the wire or cable reel using a global positioning system (GPS) receiver of the mobile device based on the target location when the mobile device is located farther than a threshold distance from the target location; and locates the wire or cable reel using a Bluetooth radio interface of the mobile device, without the GPS receiver, based on the target location when the mobile device is located closer than the threshold distance to the target location.

In some example methods, the search query is submitted to the data store via a cloud infrastructure. In some example methods, the search query is processed at the mobile device to search for the one or more user-provided wire or cable characteristics in information stored in the data store located on the wire or cable reel. In some example methods, the one or more user-provided wire or cable characteristics include at least one of (1) length or (2) wire or cable type. In some example methods, a wire or cable part number is provided in the search query. In some example methods, the search query includes at least one of a reel identifier, a product name, supplier identifier, a material description, a customer identifier, a remaining length, or a location of a corresponding wire or cable reel.

In some example methods, the mobile device emits an alert when it is within a second threshold distance to the target location. In some example methods, using the Bluetooth radio interface to locate the wire or cable reel includes communicating with a Bluetooth tag located on the wire or cable reel using a Bluetooth low energy technology. In some example methods, obtaining the identifier of the wire or cable reel includes scanning a barcode or a quick response (QR) code located on the wire or cable reel. In some example methods, obtaining the identifier of the wire or cable reel includes communicating with a Bluetooth tag located on the wire or cable reel.

In some example methods, the data store is a network data store accessible via a cloud infrastructure, or a memory located on the wire or cable reel. In some example methods, when a change occurs to at least one of the physical location of the wire or cable reel or the length of the wire or cable, a corresponding one of the at least one of the physical location of the wire or cable reel or the length of the wire or cable is updated at the data store. In some example methods, when: (1) a change occurs to at least one of the physical location of the wire or cable reel or the length of the wire or cable; or (2) a new reel is added, the data store is updated with corresponding information via a server in a cloud infrastructure. In some example methods, the physical location, the length, and the type are stored in a memory located on the wire or cable reel.

Example apparatus are disclosed to track wire or cable inventory in an inventory storage environment using an application on a mobile device. Such example apparatus include: an associator to associate, by a processor during a material intake phase, an identifier of a wire or cable reel with a physical location of the wire or cable reel in the inventory storage environment, a length of a wire or cable on the wire or cable reel, and a type of the wire or cable on the wire or cable reel; a data store interface to store, by the processor during the material intake phase, the physical location, the length, and the type at a data store separate from the mobile device; a query builder to generate, by the processor during a material retrieval phase, a search query based on one or more user-provided wire or cable characteristics, the search query to obtain a target location in response to the search query, the target location corresponding to the physical location of the wire or cable reel in the inventory storage environment; a global positioning system (GPS) receiver to locate the wire or cable reel based on the target location when the mobile device is located farther than a threshold distance from the target location; and a Bluetooth radio transceiver to locate the wire or cable reel, without use of the GPS receiver, based on the target location when the mobile device is located closer than the threshold distance to the target location.

In some example apparatus, the data store interface is further to submit the search query to the data store via a cloud infrastructure. Some example apparatus include a processor to process the search query at the mobile device to search for the one or more user-provided wire or cable characteristics in information stored in the data store located on the wire or cable reel. In some example apparatus, the one or more user-provided wire or cable characteristics include at least one of (1) length or (2) wire or cable type. In some example apparatus, the query builder is to include a wire or cable part number in the search query. In some example apparatus, the search query includes at least one of a reel identifier, a product name, supplier identifier, a material description, a customer identifier, a remaining length, or a location of a corresponding wire or cable reel.

Some example apparatus include an alert to provide a notification when the mobile device is within a second threshold distance to the target location. In some example apparatus, the Bluetooth radio transceiver is to communicate with a Bluetooth tag located on the wire or cable reel using a Bluetooth low energy technology. Some example apparatus include a camera to scan the identifier of the wire or cable reel by scanning a barcode or a quick response (QR) code located on the wire or cable reel. In some example apparatus, the Bluetooth radio transceiver is to obtain the identifier of the wire or cable reel from a Bluetooth tag located on the wire or cable reel.

In some example apparatus, the data store is a network data store accessible via a cloud infrastructure, or a memory located on the wire or cable reel. In some example apparatus, when a change occurs to at least one of the physical location of the wire or cable reel or the length of the wire or cable, the data store interface is further to update a corresponding one of the at least one of the physical location of the wire or cable reel or the length of the wire or cable at the data store. In some example apparatus, when: (1) a change occurs to at least one of the physical location of the wire or cable reel or the length of the wire or cable; or (2) a new reel is added, the data store interface is further to update the data store via a server in a cloud infrastructure. In some example apparatus, the data store interface is further to store the physical location, the length, and the type in a memory located on the wire or cable reel.

Example articles of manufacture including computer readable instructions are disclosed. When executed by a processor during a material intake phase, the computer readable instructions cause a machine to: obtain an identifier of a wire or cable reel; associate the identifier of the wire or cable reel with a physical location of the wire or cable reel in the inventory storage environment, a length of a wire or cable on the wire or cable reel, and a type of the wire or cable on the wire or cable reel; and store the physical location, the length, and the type at a network data store separate from the mobile device. When executed by the processor during a material retrieval phase, the computer readable instructions cause the machine to: receive a target location in response to a search query, the target location corresponding to the physical location of the wire or cable reel in the inventory storage environment, and the search query being based on one or more user-provided wire or cable characteristics; locate the wire or cable reel using a global positioning system (GPS) receiver of the mobile device based on the target location when the mobile device is located farther than a threshold distance from the target location; and locate the wire or cable reel using a Bluetooth radio interface of the mobile device, without the GPS receiver, based on the target location when the mobile device is located closer than the threshold distance to the target location.

In some examples, the instructions are further to cause the machine to submit the search query to the data store via a cloud infrastructure. In some examples, the instructions are further to cause the machine to process the search query at the mobile device to search for the one or more user-provided wire or cable characteristics in information stored in the data store located on the wire or cable reel. In some examples, the one or more user-provided wire or cable characteristics include at least one of (1) length or (2) wire or cable type. In some examples, the instructions cause the machine to include a wire or cable part number in the search query. In some examples, the search query includes at least one of a reel identifier, a product name, supplier identifier, a material description, a customer identifier, a remaining length, or a location of a corresponding wire or cable reel.

In some examples, the instructions are further to cause the machine to emit an alert when the mobile device is within a second threshold distance to the target location. In some examples, the instructions are to cause the machine to use the Bluetooth radio interface to locate the wire or cable reel by communicating with a Bluetooth tag located on the wire or cable reel using a Bluetooth low energy technology. In some examples, the instructions are to cause the machine to obtain the identifier of the wire or cable reel from a barcode or a quick response (QR) code located on the wire or cable reel. In some examples, the instructions are to cause the machine to obtain the identifier of the wire or cable reel by communicating with a Bluetooth tag located on the wire or cable reel.

In some examples, the data store is a network data store accessible via a cloud infrastructure, or a memory located on the wire or cable reel. In some examples, the instructions are further to cause the machine to, when a change occurs to at least one of the physical location of the wire or cable reel or the length of the wire or cable, update a corresponding one of the at least one of the physical location of the wire or cable reel or the length of the wire or cable at the data store. In some examples, the instructions are further to cause the machine to, when: (1) a change occurs to at least one of the physical location of the wire or cable reel or the length of the wire or cable; or (2) a new reel is added, update the data store with corresponding information via a server in a cloud infrastructure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to track wire or cable inventory in an inventory storage environment using an application on a mobile device, the method comprising:
   during a material intake phase:
   obtaining, by the mobile device, an identifier of a wire or cable reel;

associating, by the mobile device, the identifier of the wire or cable reel with a first physical location of the wire or cable reel in the inventory storage environment, a first length of a wire or cable on the wire or cable reel, and a first type of the wire or cable on the wire or cable reel; and storing, by the mobile device, the first physical location, the first length, and the first type in association with the identifier at a data store separate from the mobile device;

during a material retrieval phase:

receiving, at the mobile device, a target location in response to a search query, the target location corresponding to the first physical location of the wire or cable reel in the inventory storage environment, and the search query being based on one or more user-provided wire or cable characteristics;

locating the wire or cable reel using a global positioning system (GPS) receiver of the mobile device based on the target location when the mobile device is located farther than a threshold distance from the target location;

when the mobile device reaches the threshold distance from the target location:

switching between the GPS receiver of the mobile device and a Bluetooth radio interface of the mobile device; and establishing a wireless connection between the Bluetooth radio interface and a beacon disposed at the first physical location of the wire or cable reel;

locating the wire or cable reel using the Bluetooth radio interface of the mobile device, without the GPS receiver, based on the target location, when the mobile device is located closer than the threshold distance to the target location;

displaying a visual indication of the first physical location of the wire or cable reel relative to the mobile device via a user output interface of the mobile device; and synchronizing between the beacon and the data store, via the mobile device, at least one of:

(a) location information based on the wire or cable reel being moved to a second physical location; or (b) length information based on the wire or cable being changed to a second length.

2. The method as defined in claim 1, wherein the data store is a network data store accessible via a cloud infrastructure, or a memory located on the wire or cable reel.

3. The method as defined in claim 1, further including submitting the search query to the data store via a cloud infrastructure.

4. The method as defined in claim 1, further including processing the search query at the mobile device to search for the one or more user-provided wire or cable characteristics in information stored in the data store located on the wire or cable reel.

5. The method as defined in claim 1, wherein the one or more user-provided wire or cable characteristics include at least one of (1) length or (2) wire or cable type.

6. The method as defined in claim 1, further including emitting an alert when the mobile device is within a second threshold distance to the target location.

7. The method as defined in claim 1, wherein using the Bluetooth radio interface to locate the wire or cable reel includes using a Bluetooth low energy technology to communicate with a Bluetooth tag implementing the beacon and located on the wire or cable reel.

8. The method as defined in claim 1, wherein obtaining the identifier of the wire or cable reel includes scanning a barcode or a quick response (QR) code located on the wire or cable reel.

9. The method as defined in claim 1, wherein obtaining the identifier of the wire or cable reel includes communicating with a Bluetooth tag implementing the beacon and located on the wire or cable reel.

10. The method as defined in claim 1, further including providing a wire or cable part number in the search query.

11. The method as defined in claim 1, wherein, when a change occurs to at least one of the first physical location of the wire or cable reel or the first length of the wire or cable, the synchronizing between the beacon and the data store, via the mobile device, includes updating a corresponding one of the location information or the length information at the data store.

12. The method as defined in claim 1, wherein the synchronizing between the beacon and the data store via the mobile device includes updating the data store with corresponding information via a server in a cloud infrastructure.

13. The method as defined in claim 1, wherein the search query includes at least one of a reel identifier, a product name, a supplier identifier, a material description, a customer identifier, a remaining length, or a location of a corresponding wire or cable reel.

14. The method as defined in claim 1, further including storing the first physical location, the first length, and the first type in a memory located on the wire or cable reel.

15. An apparatus to track wire or cable inventory in an inventory storage environment using an application on a mobile device, the apparatus comprising:

an associator to associate, by a processor during a material intake phase, an identifier of a wire or cable reel with a first physical location of the wire or cable reel in the inventory storage environment, a first length of a wire or cable on the wire or cable reel, and a first type of the wire or cable on the wire or cable reel;

a data store interface to store, by the processor during the material intake phase, the first physical location, the first length, and the first type at a data store separate from the mobile device;

a query builder to generate, by the processor during a material retrieval phase, a search query based on one or more user-provided wire or cable characteristics, the search query to obtain a target location in response to the search query, the target location corresponding to the first physical location of the wire or cable reel in the inventory storage environment;

a global positioning system (GPS) receiver to locate the wire or cable reel based on the target location when the mobile device is located farther than a threshold distance from the target location;

a Bluetooth radio transceiver to locate the wire or cable reel, without use of the GPS receiver, based on the target location when the mobile device is located closer than the threshold distance to the target location; and a reel tracker to switch between the GPS receiver of the mobile device and the Bluetooth radio transceiver of the mobile device when the mobile device reaches the threshold distance from the target location, to establish a wireless connection between the Bluetooth radio transceiver and a beacon disposed at the first physical location of the wire or cable reel and to display a visual indication of the first physical location relative to the mobile device via a user output interface of the mobile device, wherein the Bluetooth radio transceiver is to synchronize between the beacon and the data store interface at least one of: (a) location information based on the wire or cable reel being moved to a second physical location, or (b) length information based on the wire or cable being changed to a second length.

16. The apparatus as defined in claim 15, wherein the data store is a network data store accessible via a cloud infrastructure, or a memory located on the wire or cable reel.

17. The apparatus as defined in claim 15, wherein the data store interface is further to submit the search query to the data store via a cloud infrastructure.

18. The apparatus as defined in claim 15, further including a processor to process the search query at the mobile device to search for the one or more user-provided wire or cable characteristics in information stored in the data store located on the wire or cable reel.

19. The apparatus as defined in claim 15, wherein the one or more user-provided wire or cable characteristics include at least one of (1) length or (2) wire or cable type.

20. The apparatus as defined in claim 15, further including an alert to provide a notification when the mobile device is within a second threshold distance to the target location.

21. The apparatus as defined in claim 15, wherein the Bluetooth radio transceiver is to communicate with a Bluetooth tag implementing the beacon and located on the wire or cable reel using a Bluetooth low energy technology.

22. The apparatus as defined in claim 15, further including a camera to scan the identifier of the wire or cable reel by scanning a barcode or a quick response (QR) code located on the wire or cable reel.

23. The apparatus as defined in claim 15, wherein the Bluetooth radio transceiver is to obtain the identifier of the wire or cable reel from a Bluetooth tag located on the wire or cable reel.

24. The apparatus as defined in claim 15, wherein the query builder is to include a wire or cable part number in the search query.

25. The apparatus as defined in claim 15, wherein, when a change occurs to at least one of the first physical location of the wire or cable reel or the first length of the wire or cable, the synchronization between the beacon and the data store interface is used to update the data store, via the data store interface, to include a corresponding one of the second physical location or the second length.

26. The apparatus as defined in claim 15, wherein, when: (1) a change occurs to at least one of the first physical location of the wire or cable reel or the first length of the wire or cable; or (2) a new reel is added, the data store interface is further to update the data store via a server in a cloud infrastructure.

27. The apparatus as defined in claim 15, wherein the search query includes at least one of a reel identifier, a product name, a supplier identifier, a material description, a customer identifier, a remaining length, or a location of a corresponding wire or cable reel.

28. The apparatus as defined in claim 15, wherein the data store interface is further to store the physical location, the length, and the type in a memory located on the wire or cable reel.

29. An article of manufacture comprising computer readable instructions that, when executed by a processor, cause a machine to:
during a material intake phase:
obtain an identifier of a wire or cable reel;
associate the identifier of the wire or cable reel with a first physical location of the wire or cable reel in an inventory storage environment, a first length of a wire or cable on the wire or cable reel, and a first type of the wire or cable on the wire or cable reel; and
store the first physical location, the first length, and the first type in association with the identifier at a network data store separate from a mobile device;
during a material retrieval phase:
receive a target location in response to a search query, the target location corresponding to the first physical location of the wire or cable reel in the inventory storage environment, and the search query being based on one or more user-provided wire or cable characteristics;
locate the wire or cable reel using a global positioning system (GPS) receiver of the mobile device based on the target location when the mobile device is located farther than a threshold distance from the target location;
when the mobile device reaches the threshold distance from the target location:
switch between the GPS receiver of the mobile device and a Bluetooth radio interface of the mobile device; and
establish a wireless connection between the Bluetooth radio interface and a beacon disposed at the first physical location of the wire or cable reel;
locate the wire or cable reel using the Bluetooth radio interface of the mobile device, without the GPS receiver, based on the target location when the mobile device is located closer than the threshold distance to the target location;
display a visual indication of the first physical location of the wire or cable reel relative to the mobile device via a user output interface of the mobile device; and
synchronize between the beacon and the data store, via the mobile device, at least one of:
(a) location information based on the wire or cable reel being moved to a second physical location; or
(b) length information based on the wire or cable being changed to a second length.

30. The article of manufacture as defined in claim 29, wherein the data store is a network data store accessible via a cloud infrastructure, or a memory located on the wire or cable reel.

31. The article of manufacture as defined in claim 29, wherein the instructions are further to cause the machine to submit the search query to the data store via a cloud infrastructure.

32. The article of manufacture as defined in claim 29, wherein the instructions are further to cause the machine to process the search query at the mobile device to search for the one or more user-provided wire or cable characteristics in information stored in the data store located on the wire or cable reel.

33. The article of manufacture as defined in claim 29, wherein the one or more user-provided wire or cable characteristics include at least one of (1) length or (2) wire or cable type.

34. The article of manufacture as defined in claim 29, wherein the instructions are further to cause the machine to emit an alert when the mobile device is within a second threshold distance to the target location.

35. The article of manufacture as defined in claim 29, wherein the instructions are to cause the machine to use the Bluetooth radio interface to locate the wire or cable reel using a Bluetooth low energy technology to communicate with a Bluetooth tag implementing the beacon and located on the wire or cable reel.

36. The article of manufacture as defined in claim 29, wherein the instructions are to cause the machine to obtain the identifier of the wire or cable reel from a barcode or a quick response (QR) code located on the wire or cable reel.

37. The article of manufacture as defined in claim 29, wherein the instructions are to cause the machine to obtain the identifier of the wire or cable reel by communicating with a Bluetooth tag implementing the beacon and located on the wire or cable reel.

38. The article of manufacture as defined in claim 29, wherein the instructions are to cause the machine to include a wire or cable part number in the search query.

39. The article of manufacture as defined in claim 29, wherein the instructions are further to cause the machine to, in association with the synchronization between the beacon and the data store via the mobile device responsive to a change occurring to at least one of the first physical location of the wire or cable reel or the first length of the wire or cable, update a corresponding one of the at least one of the first physical location of the wire or cable reel or the first length of the wire or cable at the data store to reflect the second physical location or the second length.

40. The article of manufacture as defined in claim 29, wherein the instructions are further to cause the machine to, when: (1) a change occurs to at least one of the first physical location of the wire or cable reel or the first length of the wire or cable; or (2) a new reel is added, update the data store with corresponding information via a server in a cloud infrastructure.

41. The article of manufacture as defined in claim 29, wherein the search query includes at least one of a reel identifier, a product name, a supplier identifier, a material description, a customer identifier, a remaining length, or a location of a corresponding wire or cable reel.

* * * * *